(12) United States Patent
Gutman

(10) Patent No.: US 8,626,436 B2
(45) Date of Patent: Jan. 7, 2014

(54) NAVIGATION SYSTEM WITH CONSTRAINED RESOURCE ROUTE PLANNING OPTIMIZER AND METHOD OF OPERATION THEREOF

(75) Inventor: Ronald David Gutman, San Jose, CA (US)

(73) Assignee: Telenav, Inc., Sunnyvale, CA (US)

( * ) Notice: Subject to any disclaimer, the term of this patent is extended or adjusted under 35 U.S.C. 154(b) by 61 days.

(21) Appl. No.: 13/340,008

(22) Filed: Dec. 29, 2011

(65) Prior Publication Data

US 2012/0173135 A1 Jul. 5, 2012

Related U.S. Application Data

(60) Provisional application No. 61/428,847, filed on Dec. 30, 2010.

(51) Int. Cl.
*G01C 21/00* (2006.01)

(52) U.S. Cl.
USPC .......................................... 701/408

(58) Field of Classification Search
USPC .......................................... 701/408
See application file for complete search history.

(56) References Cited

U.S. PATENT DOCUMENTS

| | | | |
|---|---|---|---|
| 5,568,390 A | 10/1996 | Hirota et al. | |
| 5,742,922 A | 4/1998 | Kim | |
| 5,832,400 A * | 11/1998 | Takahashi et al. | 701/53 |
| 6,065,511 A | 5/2000 | McClintock | |
| 6,418,398 B1 | 7/2002 | Dueck et al. | |
| 6,591,185 B1 | 7/2003 | Polidi et al. | |
| 6,633,544 B1 | 10/2003 | Rexford et al. | |
| 6,691,025 B2 * | 2/2004 | Reimer | 701/123 |
| 6,714,857 B2 | 3/2004 | Kapolka et al. | |
| 6,812,888 B2 | 11/2004 | Drury et al. | |
| 6,859,927 B2 | 2/2005 | Moody et al. | |
| 6,996,469 B2 | 2/2006 | Lau et al. | |
| 7,219,159 B2 | 5/2007 | Mouri et al. | |
| 7,412,313 B2 | 8/2008 | Isaac | |
| 7,440,840 B2 | 10/2008 | Tsukamoto et al. | |
| 7,474,960 B1 | 1/2009 | Nesbitt | |
| 7,660,651 B2 | 2/2010 | Zhong | |
| 7,756,631 B2 | 7/2010 | Chavira et al. | |
| 7,778,769 B2 | 8/2010 | Boss et al. | |

(Continued)

FOREIGN PATENT DOCUMENTS

WO    2007059781 A1    5/2007

OTHER PUBLICATIONS

Delling et al., "High-Performance Multi-Level Graphs", "Institut fur Theoretische Informatik, Lehrstuhl fur Algorithmik", Aug. 28, 2006, pp. 1-14, Publisher: Universitat Karlsruhe, Published in: Karlsruhe, Germany.

(Continued)

*Primary Examiner* — Thomas Tarcza
*Assistant Examiner* — Alex C Dunn
(74) *Attorney, Agent, or Firm* — IP Investment Law Group

(57) ABSTRACT

A method of operation of a navigation system includes: setting a predetermined arrival level for arriving at a replenishment location; calculating an estimated arrival level for arriving at the replenishment location; generating target location based on the estimated arrival level meeting or exceeding the predetermined arrival level; and generating a travel route to a destination based on selecting the replenishment location from the target location for displaying on a device.

48 Claims, 12 Drawing Sheets

(56) References Cited

U.S. PATENT DOCUMENTS

| | | | |
|---|---|---|---|
| 7,831,433 | B1 | 11/2010 | Belvin et al. |
| 7,849,944 | B2* | 12/2010 | DeVault ................. 180/65.29 |
| 7,945,386 | B2 | 5/2011 | Lokshin et al. |
| 8,005,610 | B2 | 8/2011 | Bast et al. |
| 8,014,908 | B2 | 9/2011 | Clarke et al. |
| 8,069,127 | B2 | 11/2011 | Taylor et al. |
| 2003/0033582 | A1 | 2/2003 | Klein et al. |
| 2004/0062963 | A1* | 4/2004 | Umayahara et al. ............ 429/22 |
| 2006/0031007 | A1 | 2/2006 | Agnew et al. |
| 2006/0058955 | A1 | 3/2006 | Mehren |
| 2006/0278449 | A1* | 12/2006 | Torre-Bueno ............... 180/65.2 |
| 2007/0021909 | A1 | 1/2007 | Matsuda |
| 2007/0106465 | A1 | 5/2007 | Adam et al. |
| 2008/0133120 | A1* | 6/2008 | Romanick .................... 701/123 |
| 2008/0249667 | A1* | 10/2008 | Horvitz et al. .................... 701/1 |
| 2008/0250423 | A1 | 10/2008 | Bush et al. |
| 2008/0270016 | A1* | 10/2008 | Proietty et al. ................ 701/123 |
| 2009/0005974 | A1 | 1/2009 | Lenneman et al. |
| 2009/0063045 | A1* | 3/2009 | Figueroa et al. ............. 701/210 |
| 2009/0157289 | A1* | 6/2009 | Graessley .................... 701/123 |
| 2009/0164114 | A1 | 6/2009 | Morikawa et al. |
| 2009/0198505 | A1 | 8/2009 | Gipps et al. |
| 2009/0204316 | A1* | 8/2009 | Klampfl et al. ............... 701/123 |
| 2009/0276150 | A1 | 11/2009 | Vorlander |
| 2010/0036606 | A1 | 2/2010 | Jones |
| 2010/0049397 | A1* | 2/2010 | Liu et al. ......................... 701/33 |
| 2010/0082246 | A1* | 4/2010 | Crane ........................... 701/209 |
| 2010/0198508 | A1 | 8/2010 | Tang |
| 2010/0211643 | A1 | 8/2010 | Lowenthal et al. |
| 2011/0208417 | A1* | 8/2011 | Fink et al. .................... 701/200 |
| 2011/0288765 | A1* | 11/2011 | Conway ........................ 701/201 |
| 2012/0173134 | A1 | 7/2012 | Gutman |
| 2012/0173135 | A1 | 7/2012 | Gutman |
| 2012/0181985 | A1 | 7/2012 | Lowenthal et al. |

OTHER PUBLICATIONS

Goldberg et al., "Better Landmarks Within Reach", 2007, pp. 38-51, Springer-Verlag Berlin Heidelberg, Microsoft Research Silicon Valley, 1065 La Avenida, Mountain View, CA 94043, USA.

Ron Gutman, "Reach-based Routing: A New Approach to Shortest Path Algorithms Optimized for Road Networks", Jan. 6, 2004, p. 12, Published in: Emeryville, CA, USA, http://www.siam.org/meetings/alenex04/abstacts/rgutman1.pdf.

Dominik Schultes, "Route Planning in Road Networks", Feb. 7, 2008, pp. 235 pgs, Publisher: von der Fakultat fur Informatik der Universitat Fridericiana zu Karlsruhe, Published in: Karlsruhe, Germany.

* cited by examiner

NAVIGATION SYSTEM WITH CONSTRAINED RESOURCE ROUTE PLANNING OPTIMIZER AND METHOD OF OPERATION THEREOF

CROSS-REFERENCE TO RELATED APPLICATION(S)

This application claims the benefit of U.S. Provisional Patent Application Ser. No. 61/428,847 filed Dec. 30, 2010, and the subject matter thereof is incorporated herein by reference thereto.

The present application contains subject matter related to a concurrently filed U.S. patent application by Ronald David Gutman entitled "NAVIGATION SYSTEM WITH CONSTRAINED RESOURCE ROUTE PLANNING MECHANISM AND METHOD OF OPERATION THEREOF." The related application is assigned to Telenav, Inc. and is identified by docket number 59-041. The subject matter thereof is incorporated herein by reference thereto.

TECHNICAL FIELD

The present invention relates generally to a navigation system, and more particularly to a system for route planning mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world". One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, an excessive computation burden and delay in displaying the route prior to reaching the destination has become a paramount concern for the consumer. Inadequate planning of the route by the navigation system decreases the benefit of using the tool.

Thus, a need still remains for a navigation system with route planning mechanism to expedite the generation of the route to reach the destination. In view of the ever-increasing commercial competitive pressures, along with growing consumer expectations and the diminishing opportunities for meaningful product differentiation in the marketplace, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: setting a predetermined arrival level for arriving at a replenishment location; calculating an estimated arrival level for arriving at the replenishment location; generating a target location based on the estimated arrival level meeting or exceeding the predetermined arrival level; and generating a travel route to a destination based on selecting the replenishment location from the target location for displaying on a device.

The present invention provides a navigation system, including: a predetermined level module for setting a predetermined arrival level for arriving at a replenishment location; a calculator pre-computation submodule, coupled to the predetermined level module, for calculating an estimated arrival level for arriving at the replenishment location; a return pre-computation submodule, coupled to the predetermined level module, for generating a target location based on the estimated arrival level meeting or exceeding the predetermined arrival level; and a route planning module, coupled to the return pre-computation submodule, for generating a travel route to a destination based on selecting the replenishment location from the target location for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
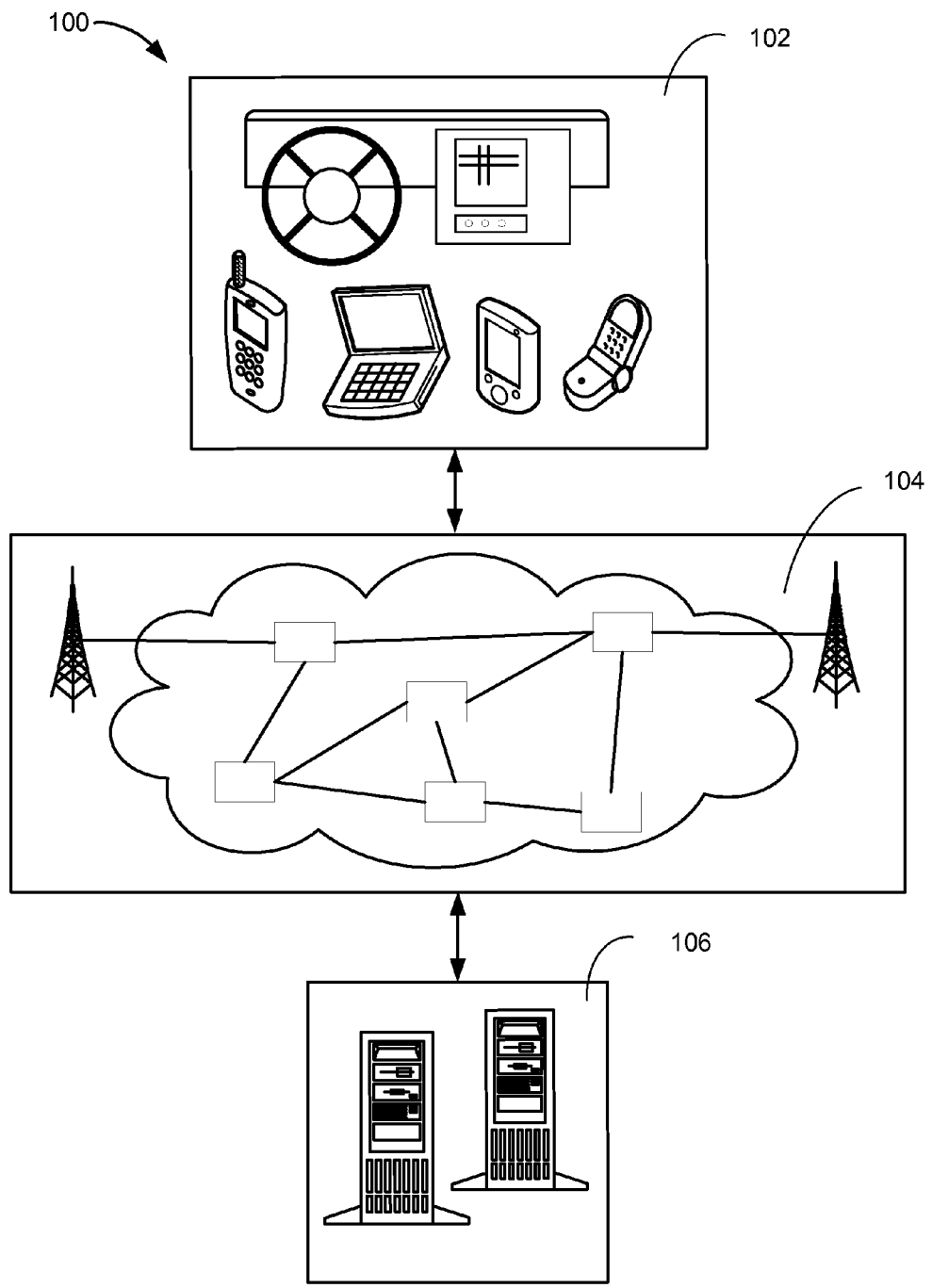
FIG. 1 is a navigation system with constrained resource route planning optimizer mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X,Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with constrained resource route planning optimizer mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
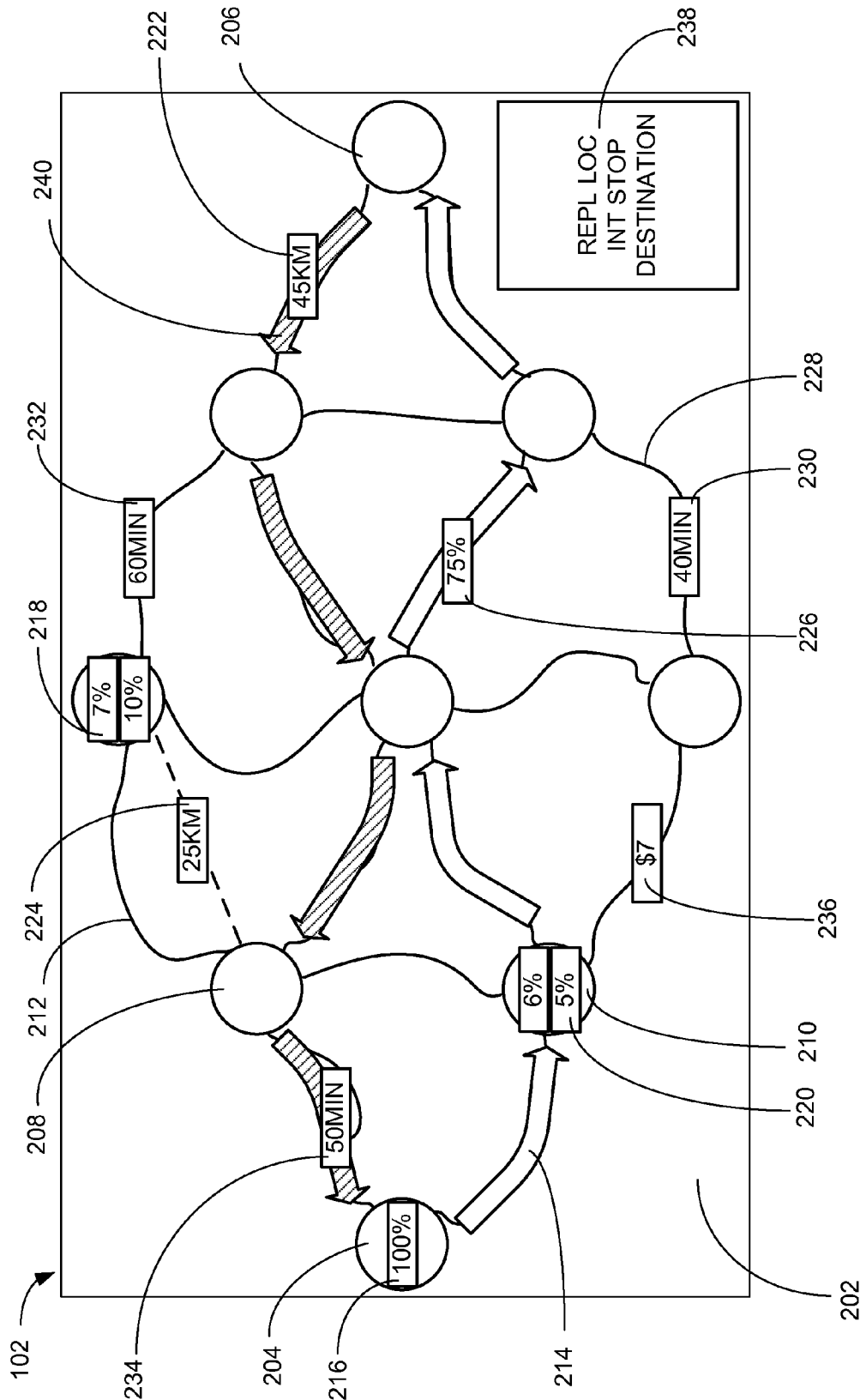
FIG. 2 is a first example of a display on a display interface of the first device.

Referring now to FIG. 2, therein is shown a first example of a display on a display interface 202 of the first device 102. A travel route 214 is defined as a path where by traveling along the path, the vehicle will be ensured to have an adequate amount of resource, fuel, or the combination thereof to reach a destination 206. The travel route 214 includes a start location 204, an intermediate stop 208, a replenishment location 210, the destination 206, or the combination thereof.

The start location 204 is defined as the starting point of the travel route 214. The destination 206 is defined as the ending point of the travel route 214. The intermediate stop 208 is defined as a geographic location where the vehicle can stop by prior to reaching the destination 206 and after the start location 204 traversing the travel route 214.

The replenishment location 210 is defined as a geographic location where the vehicle can replenish the resource, fuel, or the combination thereof to continue the travel for reaching the destination 206. For example, resource can include water, coolant, lubricant, or the combination thereof. Fuel can include electricity, biodiesel, hydrogen fuel, pressurized air, or the combination thereof.

The travel route 214 can include multiple paths of a travel section 212. The travel section 212 is defined as the path between the stopping points. The stopping points include the start location 204, the replenishment location 210, the intermediate stop 208, the destination 206, or the combination thereof. For example, the travel section 212 can represent a path between a stopping point representing the replenishment location 210 and another stopping point representing the intermediate stop 208.

For a further example, the first of the travel section 212 can be a path between the start location 204 and the replenishment location 210. A second of the travel section 212 can be a path between the replenishment location 210 and the intermediate stop 208. Another of the travel section 212 can be a path between the intermediate stop 208 and the destination 206. The travel route 214 can include the travel section 212 between the start location 204 to the replenishment location 210, the travel section 212 between the replenishment location 210 to the intermediate stop 208, and the travel section 212 between the intermediate stop 208 to the destination 206.

A current location estimated level 216 is defined as the estimation of the amount of resource, fuel, or the combination thereof in the vehicle when the vehicle is at the current vantage point. The vantage point includes the start location 204, the intermediate stop 208, the replenishment location 210, or the destination 206.

For example, the current vantage point can be the start location 204. The current location estimated level 216 when an electric vehicle is at the start location 204 can be 100% of full battery capacity.

For a different example, the current vantage point can be the replenishment location 210 after leaving the start location 204. The current location estimated level 216 at the replenishment location 210 can also be 100% of full battery capacity after the user recharges the vehicle fully.

An estimated arrival level 218 is defined as the estimation for the amount of resource, fuel, or the combination thereof remaining after arriving at the start location 204, the intermediate stop 208, the replenishment location 210, the destination 206, or the combination thereof. For example, an electric vehicle can have the estimated arrival level 218 of 25% of full battery capacity after reaching the replenishment location 210. For a further example, if the user does not replenish the vehicle at the replenishment location 210, the current location estimated level 216 can equal the estimated arrival level 218.

A predetermined arrival level 220 is defined as the minimum threshold level of the resource, fuel, or the combination thereof the vehicle, utilizing the navigation system 100, must have remaining for arriving at the next stopping point. For example, in order for the navigation system 100 for an electric vehicle to select the replenishment location 210 after leaving the start location 204, the vehicle must have at least 5% of full battery capacity upon arriving at the replenishment location 210.

A section distance 222 is defined as the physical distance of the travel section 212. For example, the travel section 212 from the replenishment location 210 to the intermediate stop 208 can be 45 kilometers.

A predetermined distance 224 is defined as the straight line distance between one stopping point to another stopping point traversing along the surface of the planet Earth. For example, the straight line distance between one stopping point to another stopping point is not necessarily the section distance 222 of the travel section 212. More specifically, if the travel section 212 is a curvy road, the section distance 222 can account for the distance for the curvature of the path.

In contrast, the predetermined distance 224 does not account for the distance for the curvature of the path. More specifically, the straight line does not necessarily represent a physical path that a vehicle can travel, but a direct line from one stopping point to another stopping point. For example, the section distance 222 between the intermediate stop 208 to the replenishment location 210 can be 45 kilometers. The predetermined distance 224 between the same two locations of the intermediate stop 208 to the replenishment location 210 can be 25 kilometers.

An estimated consumption level 226 is defined as the estimation for the amount of resource, fuel, or the combination thereof consumed for traversing the travel section 212. For example, an electric vehicle can consume the estimated consumption level 226 of 75% of full battery capacity for traversing the travel section 212 from one of the replenishment location 210 to another location of the replenishment location 210.

An alternate transportation route 228 is defined as a path that a user can take other than the user's vehicle for reaching the next stopping point. For example, the alternate transportation route 228 can represent a train track. The user can take the train from the replenishment location 210 to reach the destination 206.

An estimated alternate transportation time 230 is defined as the estimated time for the user to traverse the alternate transportation route 228. For example, the user can take 40 minutes on the train to traverse the alternate transportation route 228.

An allotted alternate transportation travel time 232 is defined as the maximum time allocated by the user, the navigation system 100, or the combination thereof for traversing the alternate transportation route 228. For example, the allotted alternate transportation travel time 232 can be 60 minutes for traversing the alternate transportation route 228.

An estimated sectional travel time 234 is defined as the estimation of the time required to complete traversing the travel section 212. For example, the estimated sectional travel time 234 for traversing from one of the intermediate stop 208 to another location of the intermediate stop 208 can be 50 minutes.

An estimated sectional financial cost 236 is defined as the estimation of the monetary cost that a user can incur for traversing the travel section 212. For example, a toll plaza can exist on the travel section 212 between the replenishment location 210 to the intermediate stop 208. The toll plaza can charge a fee of US 7 dollars. The estimated sectional financial cost 236 for traversing that particular path of the travel section 212 can be US 7 dollars.

A target location 238 is defined as a geographic location that has been identified by the navigation system 100 to aid the generation of the travel route 214. For example, the target location 238 can include the replenishment location 210, the intermediate stop 208, or the combination thereof. The pre-computation of the list of geographic locations and the benefit from generating the travel route 214 based on the target location 238 will be discussed later.

A reverse travel route 240 is defined as a path where by traveling along the path, the vehicle will be ensured to have an adequate amount of resource, fuel, or the combination thereof to reach the start location 204 from various stopping points. The reverse travel route 240 includes the start location 204, the intermediate stop 208, the replenishment location 210, the destination 206, or the combination thereof.

For example, the reverse travel route 240 can be the same as the travel route 214 traversing through the same stopping points representing the replenishment location 210, the intermediate stop 208, or the combination thereof, but starting from the destination 206 to reach the start location 204. For a different example, the reverse travel route 240 can be different from the travel route 214 traversing through different stopping points representing the replenishment location 210, the intermediate stop 208, or the combination thereof, but starting from the destination 206 to reach the start location 204. Similar to the travel route 214, the reverse travel route 240 can include multiple paths of the travel section 212.

Figure 3:
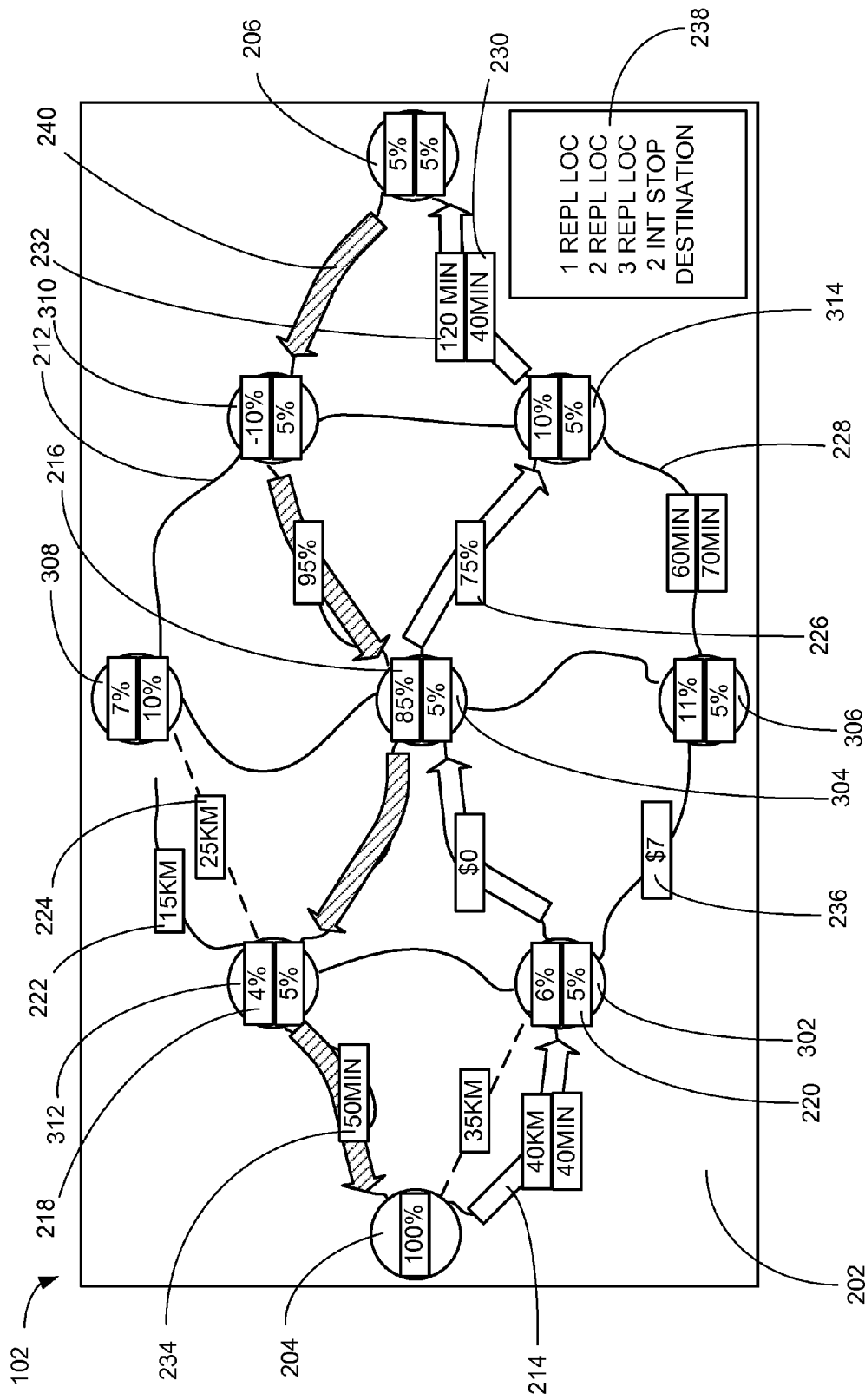
FIG. 3 is a second example of a display on the display interface of the first device.

Referring now to FIG. 3, therein is shown a second example of a display on the display interface 202 of the first device 102. The second example illustrates various factors that influence the generation of the target location 238 by the navigation system 100.

For example, the replenishment location 210 of FIG. 2 can include a first replenishment location 302, a second replenishment location 304, a third replenishment location 306, a fourth replenishment location 308, and a fifth replenishment location 310. The first replenishment location 302, the second replenishment location 304, the third replenishment location 306, the fourth replenishment location 308, and the fifth replenishment location 310 are further examples of the replenishment location 210, and are defined as the replenishment location 210.

For example, the intermediate stop 208 of FIG. 2 can include a first intermediate stop 312 and a second intermediate stop 314. The first intermediate stop 312 and the second intermediate stop 314 are further examples of the intermediate stop 208, and are defined as the intermediate stop 208.

As one of the factors, the navigation system 100 can generate the target location 238 based on the estimated arrival level 218 meeting or exceeding the predetermined arrival level 220. For example, the predetermined arrival level 220 for the first intermediate stop 312 and the first replenishment location 302 can be 5% of full battery capacity for an electric vehicle. If the estimated arrival level 218 for arriving at the first replenishment location 302 is 6% after departing the start location 204, the navigation system 100 can select the first replenishment location 302 to be included in the target location 238. In contrast, if the estimated arrival level 218 for arriving at the first intermediate stop 312 is 4% after departing the start location 204, the navigation system 100 can avoid selecting the first intermediate stop 312 to be included in the target location 238.

As another factor, the navigation system 100 can generate the target location 238 based on the section distance 222 meeting or exceeding the predetermined distance 224. For example, the predetermined distance 224 from the start location 204 to the first replenishment location 302 can be 35 kilometers. Additionally, the section distance 222 from the start location 204 to the first replenishment location 302 can be 40 kilometers. Since the section distance 222 exceeds the predetermined distance 224, the navigation system 100 can select the first replenishment location 302 as one of the geographic locations representing the target location 238.

In contrast, the predetermined distance 224 from the first intermediate stop 312 to the fourth replenishment location 308 can be 25 kilometers. Additionally, the section distance 222 from the first intermediate stop 312 to the fourth replenishment location 308 can be 15 kilometers. More specifically, the travel section 212 from the first intermediate stop 312 heading towards the fourth replenishment location 308 falls short of reaching the fourth replenishment location 308.

Since the predetermined distance 224 exceeds the section distance 222, the navigation system 100 can avoid selecting the fourth replenishment location 308 and prune the travel section 212 between the first intermediate stop 312 to the fourth replenishment location 308 for generating the target location 238. The pruning of the travel section 212 that fails to meet the predetermined distance 224 can aid the navigation system 100 by reducing the computation burden of generating the travel route 214. The details regarding the pruning of the travel section 212 will be discussed later.

As another factor, the navigation system 100 can generate the target location 238 based on the current location estimated level 216 meeting or exceeding the estimated consumption level 226. For example, the current location estimated level 216 when the user's electric vehicle is at the second replenishment location 304 can be 85% of full battery capacity. The estimated consumption level 226 for traversing the travel section 212 from the second replenishment location 304 to the second intermediate stop 314 can be 75% of full battery capacity. Since the current location estimated level 216 exceeds the estimated consumption level 226, the navigation system 100 can select the second intermediate stop 314 as one of the geographic locations representing the target location 238.

In contrast, the estimated consumption level 226 for traversing the travel section 212 from the second replenishment location 304 to the fifth replenishment location 310 can be 95% of full battery capacity. Since the estimated consumption level 226 exceeds the current location estimated level 216, the navigation system 100 can avoid selecting the fifth replenishment location 310 as one of the geographic locations representing the target location 238.

As another factor, the navigation system 100 can generate the target location 238 based on the allotted alternate transportation travel time 232 meeting or exceeding the estimated alternate transportation time 230. For example, the allotted alternate transportation travel time 232 for traversing the alternate transportation route 228 from the second intermediate stop 314 to the destination 206 or from the second intermediate stop 314 to the fifth replenishment location 310 can be both 60 minutes. The estimated alternate transportation time 230 for traversing the alternate transportation route 228 from the second intermediate stop 314 to the destination 206 can be 40 minutes. Since the allotted alternate transportation travel time 232 exceeds the estimated alternate transportation time 230, the navigation system 100 can select the destination 206 as one of the geographic locations representing the target location 238.

In contrast, the estimated alternate transportation time 230 for traversing the alternate transportation route 228 from the second intermediate stop 314 to the fifth replenishment location 310 can be 70 minutes. Since the estimated alternate transportation time 230 exceeds the allotted alternate transportation travel time 232, the navigation system 100 can avoid selecting the fifth replenishment location 310 as one of the geographic locations representing the target location 238.

As another factor, the navigation system 100 can generate the target location 238 based on comparing the estimated sectional travel time 234 for traversing the travel section 212 to reach, the replenishment location 210, the intermediate stop 208, the destination 206, or the combination thereof. For example, the estimated sectional travel time 234 for traversing the travel section 212 from the start location 204 to the first replenishment location 302 can be 40 minutes.

In contrast, the estimated sectional travel time 234 for traversing the travel section 212 from the start location 204 to the first intermediate stop 312 can be 50 minutes. Since the estimated sectional travel time 234 for traversing the travel section 212 from the start location 204 to the first replenishment location 302 is less than from the start location 204 to the first intermediate stop 312, the navigation system 100 can select the first replenishment location 302 and not select the first intermediate stop 312 as one of the geographic locations representing the target location 238.

As another factor, the navigation system 100 can generate the target location 238 based on comparing the estimated sectional financial cost 236 for traversing the travel section 212 to reach the start location 204, the replenishment location 210, the intermediate stop 208, the destination 206, or the combination thereof. For example, the estimated sectional financial cost 236 for traversing the travel section 212 from the first replenishment location 302 to the second replenishment location 304 can be USD $0.

In contrast, the estimated sectional financial cost 236 for traversing the travel section 212 from the first replenishment location 302 to the third replenishment location 306 can be USD $7. Since the estimated sectional financial cost 236 for traversing the travel section 212 from the first replenishment location 302 to the second replenishment location 304 is less than from the first replenishment location 302 to the third replenishment location 306, the navigation system 100 can select the second replenishment location 304 and not select the third replenishment location 306 as one of the geographic locations representing the target location 238.

From the factors discussed above, the navigation system 100 can generate the target location 238. Continuing with the examples raised previously, the navigation system 100 can generate the target location 238 that can include the first replenishment location 302, the second replenishment location 304, the third replenishment location 306, the second intermediate stop 314, and the destination 206.

Figure 4:
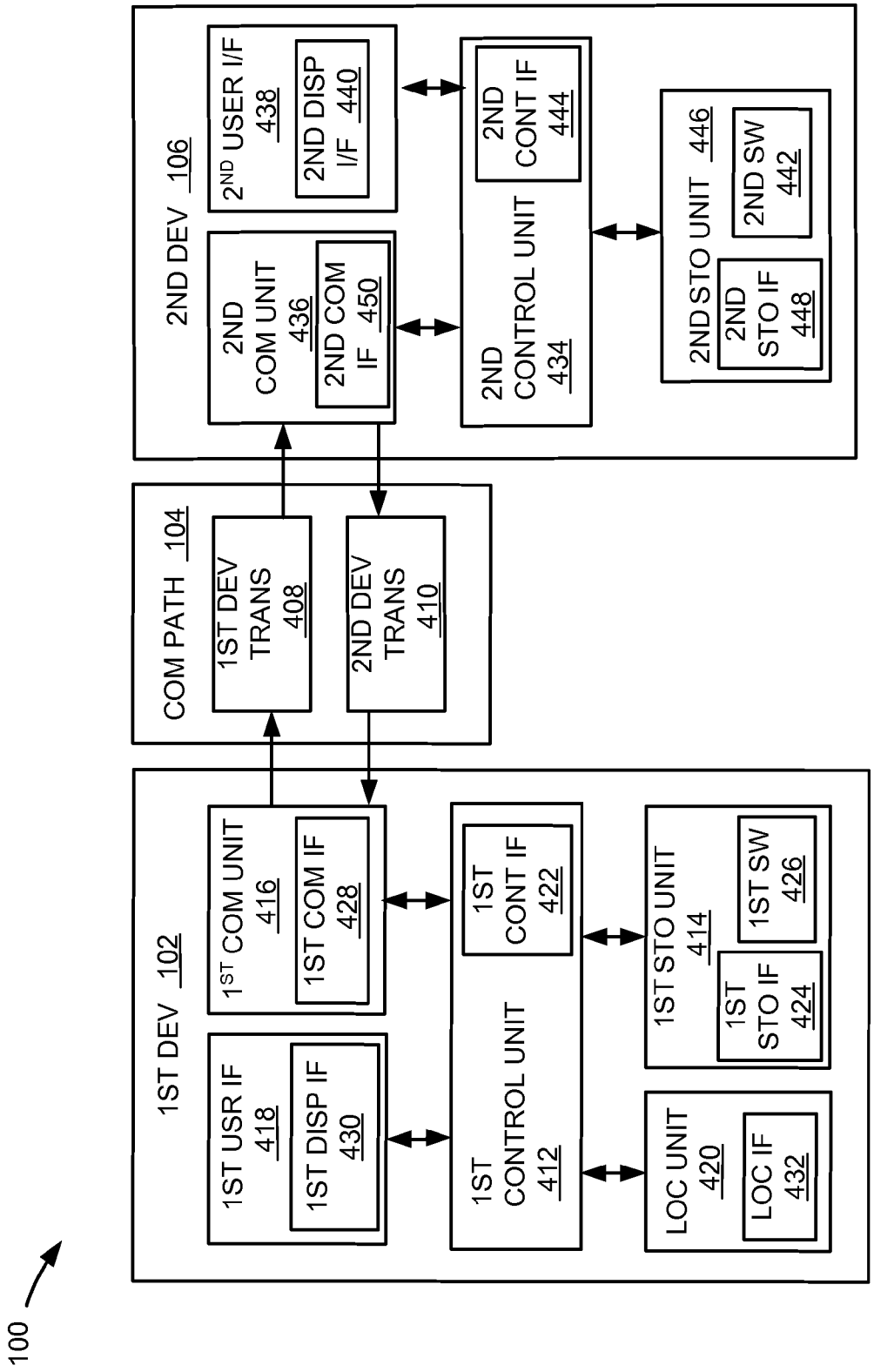
FIG. 4 is an exemplary block diagram of the navigation system.

Referring now to FIG. 4, therein is shown an exemplary block diagram of the navigation system 100. The navigation system 100 can include the first device 102, the communication path 104, and the second device 106. The first device 102 can send information in a first device transmission 408 over the communication path 104 to the second device 106. The second device 106 can send information in a second device transmission 410 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 412, a first storage unit 414, a first communication unit 416, a first user interface 418, and a location unit 420. The first device 102 can be similarly described by the first device 102.

The first control unit 412 can include a first control interface 422. The first control unit 412 can execute a first software 426 to provide the intelligence of the navigation system 100. The first control unit 412 can be implemented in a number of different manners. For example, the first control unit 412 can be a processor, an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations external to the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate location information, current heading, and current speed of the first device 102, as examples. The location unit 420 can be implemented in many ways. For example, the location unit 420 can function as at least a part of a global positioning system (GPS), an inertial navigation system, a cellular-tower location system, a pressure location system, or any combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations external to the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, points of interest (POI), navigation routing entries, or any combination thereof.

The first storage unit 414 can be a volatile memory, a nonvolatile memory, an internal memory, an external memory, or a combination thereof. For example, the first storage unit 414 can be a nonvolatile storage such as nonvolatile random access memory (NVRAM), Flash memory, disk storage, or a volatile storage such as static random access memory (SRAM).

The first storage unit 414 can include a first storage interface 424. The first storage interface 424 can be used for communication between the location unit 420 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations external to the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106 of FIG. 1, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, or any combination thereof to provide data and communication inputs.

The first user interface 418 can include a first display interface 430. The first display interface 430 can include a display, a projector, a video screen, a speaker, or any combination thereof.

The first control unit 412 can operate the first user interface 418 to display information generated by the navigation system 100. The first control unit 412 can also execute the first software 426 for the other functions of the navigation system 100, including receiving location information from the location unit 420. The first control unit 412 can further execute the first software 426 for interaction with the communication path 104 via the first communication unit 416.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second controller interface 444. The second controller interface 444 can be used for communication between the second control unit 434 and other functional units in the second device 106. The second controller interface 444 can also be used for communication that is external to the second device 106.

The second controller interface 444 can receive information from the other functional units or from external sources, or can transmit information to the other functional units or to external destinations. The external sources and the external destinations refer to sources and destinations external to the second device 106.

The second controller interface 444 can be implemented in different ways and can include different implementations depending on which functional units or external units are being interfaced with the second controller interface 444. For example, the second controller interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the location unit 420 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations external to the second device 106.

The second storage interface 448 can include different implementations depending on which functional units or external units are being interfaced with the second storage unit 446. The second storage interface 448 can be implemented with technologies and techniques similar to the implementation of the second controller interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second controller interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The navigation system 100 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 420, although it is understood that the second device 106 can also operate the location unit 420.

Figure 5:
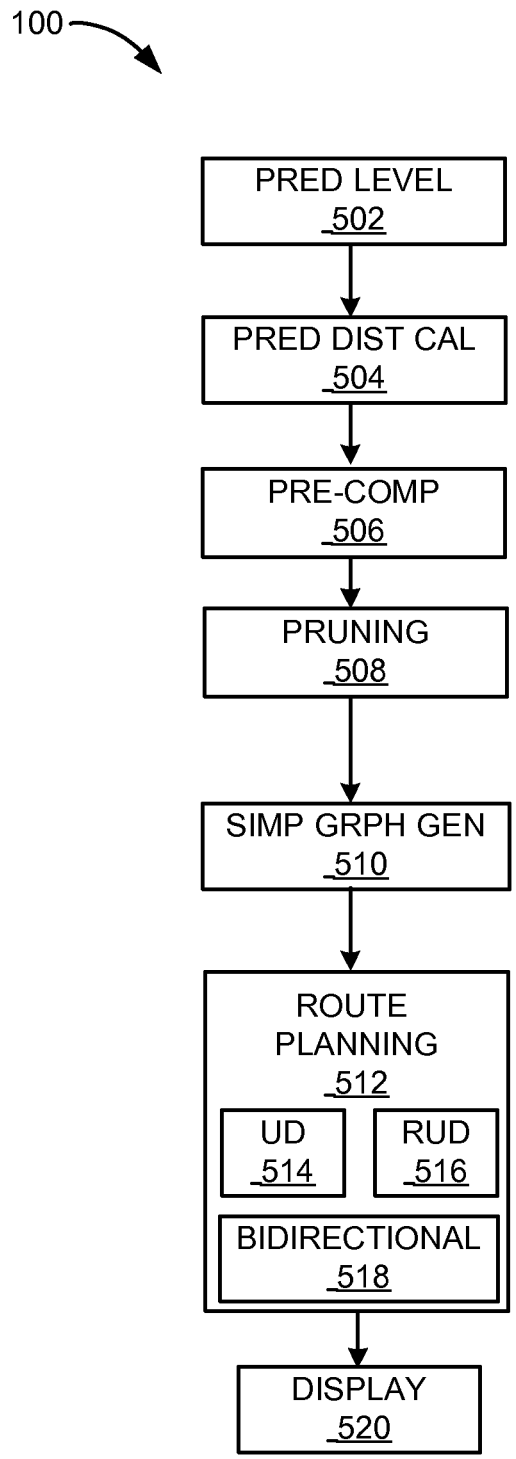
FIG. 5 is a flow of the navigation system.

Referring now to FIG. 5, therein is shown a flow of the navigation system 100. The flow of the navigation system 100 can utilize the graph theory for generating the travel route 214 of FIG. 2. The flow is not depicted by the graph theory format.

The navigation system 100 can include a predetermined level module 502. The predetermined level module 502 sets the minimum level of resource, fuel, or the combination thereof required for the vehicle when it arrives at each of the stopping points along the travel route 214. For example, the predetermined level module 502 can set the predetermined arrival level 220 of FIG. 2 for arriving at the replenishment location 210, the destination 206, the intermediate stop 208, or the combination thereof. For a further example, the predetermined level module 502 can set the predetermined arrival level 220 for arriving at the second replenishment location 304 of FIG. 3.

The predetermined level module 502 can set the predetermined arrival level 220 in a number of ways. For example, the predetermined arrival level 220 can set the predetermined arrival level 220 for operating an electric vehicle by defining that the electric vehicle must have at least 5% of the full battery capacity upon arrival at each of the stopping points. As a different example, the predetermined level module 502 can set the predetermined arrival level 220 for operating a gasoline powered vehicle by defining that the gasoline powered vehicle must have at least 1 gallon of gasoline upon arrival at each of the stopping points.

The navigation system 100 can include a predetermined distance calculator module 504. The predetermined distance calculator module 504 calculates the straight line distance from one stopping point to another along the travel route 214. For example, the predetermined distance calculator module 504 can calculate the predetermined distance 224 of FIG. 2 for reaching the replenishment location 210, the destination 206, the intermediate stop 208, or the combination thereof. For a further example, the predetermined distance calculator module 504 can calculate the predetermined distance 224 between the first replenishment location 302 of FIG. 3 and the second replenishment location 304. As a more specific example, the predetermined distance calculator module 504 can calculate the straight line distance between the GPS coordinates of the first replenishment location 302 and the second replenishment location 304 for the predetermined distance 224.

The navigation system 100 can include a pre-computation module 506. The pre-computation module 506 reduces the number of map nodes considered for generating the travel route 214. The travel section 212 between one stopping point to another stopping point can be computed in advance to produce a simplified graph with far fewer nodes. The nodes include the start location 204 of FIG. 2, the destination 206 of FIG. 2, the intermediate stop 208 of FIG. 2, the replenishment location 210 of FIG. 2, or the combination thereof. For example, the pre-computation module 506 can generate the target location 238 of FIG. 2 based on the estimated arrival level 218 of FIG. 2 meeting or exceeding the predetermined arrival level 220. Details regarding the pre-computation module 506 will be discussed later.

The navigation system 100 can include a pruning module 508. The pruning module 508 prunes nodes based on eliminating the path that fails to reach the next stopping point. For example, the pruning module 508 can generate the target location 238 by selecting the replenishment location 210 based on the section distance 222 of FIG. 2 meeting or exceeding the predetermined distance 224 of FIG. 2. Details regarding the pruning module 508 will be discussed later.

The navigation system 100 can include a simplified graph generator module 510. The simplified graph generator module 510 can generate the simplified graph based on the target location 238 for a route planning module 512 to generate the travel route 214. Details regarding the simplified graph generator module 510 will be discussed later.

The navigation system 100 can include the route planning module 512. The route planning module 512 generates a path that ensures the vehicle utilizing the navigation system 100 with adequate amount of resource, fuel, or the combination thereof for reaching the target destination. For example, the route planning module 512 can generate the travel route 214 to the destination 206 based on selecting the replenishment location 210 from the target location 238 for displaying on the first device 102 of FIG. 1.

The route planning module 512 can generate the travel route 214 in a number of ways. For example, the route planning module 512 can include a uni-directional module 514. The uni-directional module 514 can generate the travel route 214 from the start location 204 to the destination 206 based on the target location 238. Details regarding the uni-directional module 514 will be discussed later.

As a different example, the route planning module 512 can include a reverse uni-directional module 516. The reverse uni-directional module 516 can generate the travel route 214 from the destination 206 to the start location 204 based on the target location 238. Details regarding the reverse uni-directional module 516 will be discussed later.

For another example, the route planning module 512 can include a bidirectional module 518. The bidirectional module 518 can process the algorithm discussed in the uni-directional module 514 and the reverse uni-directional module 516 for generating the travel route 214. Details regarding the bidirectional module 518 will be discussed later.

The navigation system 100 can include a display module 520. The display module 520 displays the travel route 214 for the user to follow to reach the destination 206.

The physical transformation from displaying the travel route 214 results in movement in the physical world, such as people using the first device 102 of FIG. 1, the vehicle, or a combination thereof, based on the operation of the navigation system 100. As the movement in the physical world occurs, the movement itself creates additional information that is converted back to calculate the estimated arrival level 218, the current location estimated level 216, the estimated consumption level 226, the estimated alternate transportation time 230, the estimated sectional travel time 234, the estimated sectional financial cost 236, or the combination thereof for generating the target location 238 for the continued operation of the navigation system 100 and to continue the movement in the physical world.

The first software 426 of FIG. 4 of the first device 102 of FIG. 4 can include the navigation system 100. For example, the first software 426 can include the predetermined level module 502, the predetermined distance calculator module 504, the pre-computation module 506, the pruning module 508, the route planning module 512, and the display module 520.

The first control unit 412 of FIG. 4 can execute the first software 426 for the predetermined level module 502 to calculate the predetermined arrival level 220. The first control unit 412 of can execute the first software 426 for the predetermined distance calculator module 504 to calculate the predetermined distance 224.

The first control unit 412 of can execute the first software 426 for the pre-computation module 506, the pruning module 508, or the combination thereof to generate the target location 238. The first control unit 412 of can execute the first software 426 for the simplified graph generator module 510 to generate the simplified graph. The first control unit 412 of can execute the first software 426 for the route planning module to generate the travel route 214 to the destination 206 based on the target location 238.

The display module 520 can represent the first display interface 430 of FIG. 4. The first control unit 412 of can execute the first display interface 430 to display the travel route 214.

The second software 442 of FIG. 4 of the second device 106 of FIG. 4 can include the navigation system 100. For example, the second software 442 can include the predetermined level module 502, the predetermined distance calculator module 504, the pre-computation module 506, the pruning module 508, the route planning module 512, and the display module 520.

The second control unit 434 of FIG. 4 can execute the second software 442 for the predetermined level module 502 to calculate the predetermined arrival level 220. The second control unit 434 can execute the second software 442 for the predetermined distance calculator module 504 to calculate the predetermined distance 224.

The second control unit 434 can execute the second software 442 for the pre-computation module 506, the pruning module 508, or the combination thereof to generate the target location 238. The second control unit 434 can execute the second software 442 for the simplified graph generator module 510 to generate the simplified graph. The second control unit 434 can execute the second software 442 for the route planning module to generate the travel route 214 to the destination 206 based on the target location 238.

The display module 520 can represent the second display interface 440 of FIG. 4. The second control unit 434 can execute the second display interface 440 for displaying the travel route 214.

The navigation system 100 can be partitioned between the first software 426 and the second software 442. For example, the second software 442 can include the predetermined level module 502, the predetermined distance calculator module 504, the pre-computation module 506, the pruning module 508, the simplified graph generator module 510, and the route planning module 512. The second control unit 434 can execute modules partitioned on the second software 442 as previously described.

The first software 426 can include the display module 520. Based on the size of the first storage unit 414 of FIG. 4, the first software 426 can include additional modules of the navigation system 100. The first control unit 412 can execute the modules partitioned on the first software 426 as previously described.

The first user interface 418 of FIG. 4 can receive an entry by the user for the destination 206. The first control unit 412 can operate the first communication unit 416 of FIG. 4 to send the entry to the second device 106. The first control unit 412 can operate the first software 426 to operate the location unit 420 of FIG. 4.

The second communication unit 436 of FIG. 4 can send the travel route 214 to the first device 102 through the communication path 104 of FIG. 4. The travel route 214 can be displayed on the first display interface 430 and the second device.

It has been discovered that the present invention provides the navigation system 100 for providing a safe operation of the navigation system 100 and other user interface system within a vehicle. The benefit is provided by generating the target location 238 for speeding up and reducing the computation burden for generating the travel route 214 to aid the user for viewing the travel route 214 more quickly to operate the vehicle more safely for reaching the destination 206. Furthermore, by pre-computing, pruning, or the combination thereof to generate the target location 238, the navigation system 100 can reduce the computation burden and calculate more accurate value for the estimated arrival level 218, the estimated consumption level 226, the estimated alternate transportation time 230, the estimated sectional travel time 234, the estimated sectional financial cost 236, or the combination thereof to aid the user of safer operation of the vehicle.

The navigation system 100 describes the module functions or order as an example. The modules can be partitioned differently. For example, the uni-directional module 514 and the reverse uni-directional module 516 can be combined. Each of the modules can operate individually and independently of the other modules.

Furthermore, data generated in one module can be used by another module without being directly coupled to each other. For example, the predetermined level module 502 can generate the predetermined arrival level 220. The pruning module 508 can generate the target location 238 based on finding out whether the estimated arrival level 218 met or exceeded the predetermined arrival level 220.

Figure 6:
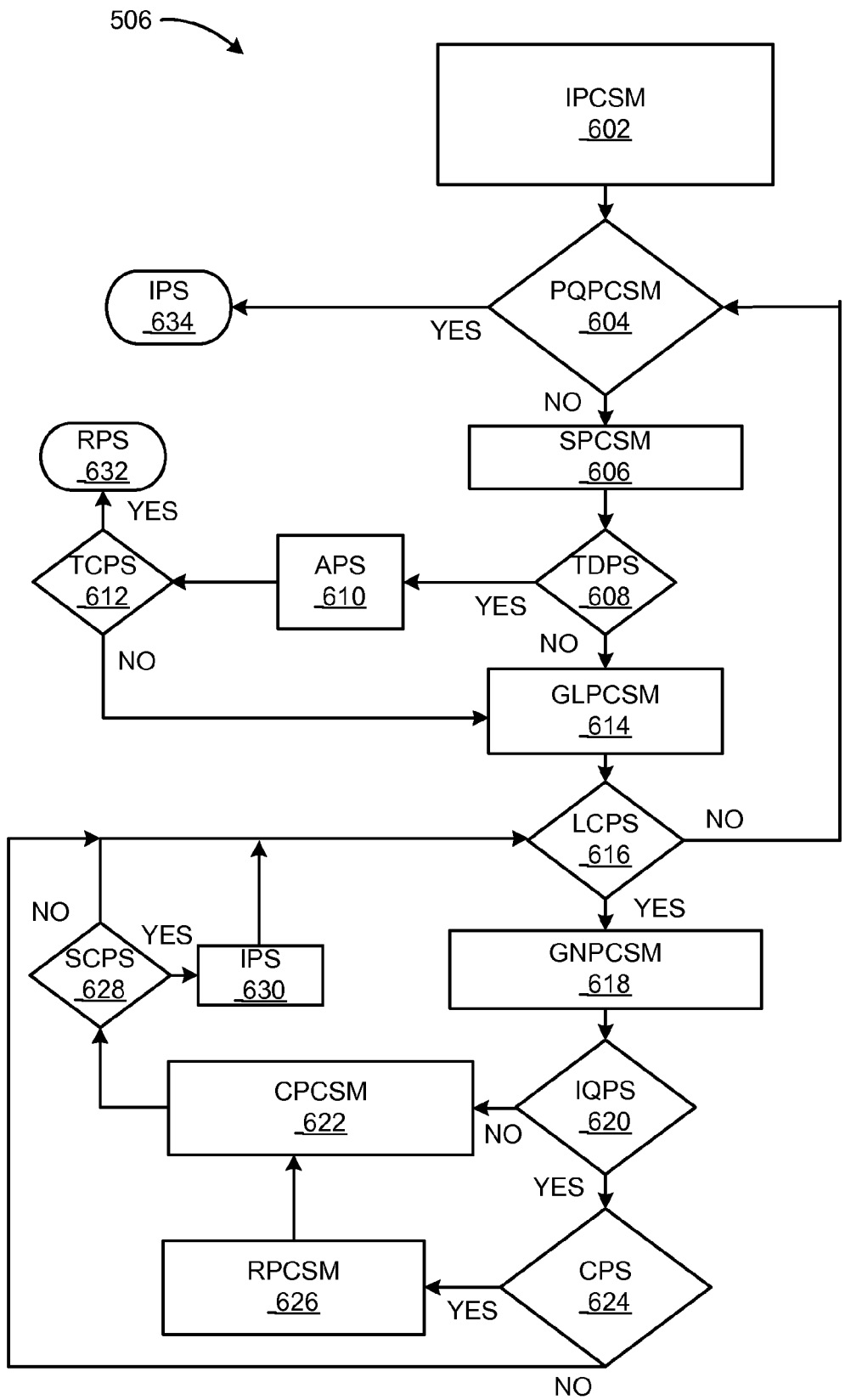
FIG. 6 is a flow of the pre-computation module.

Referring now to FIG. 6, therein is shown a flow of the pre-computation module 506. The pre-computation module 506 generates a list of candidates for the next location where the vehicle can stop by before reaching the target destination. For example, the pre-computation module 506 can generate the target location 238 of FIG. 2 by selecting the replenishment location 210 of FIG. 2 based on the estimated arrival level 218 of FIG. 2 meeting or exceeding the predetermined arrival level 220 of FIG. 2. The pre-computation module 506 can be shown in pseudo code format as in the following pseudo code 1:

```
Function RoutePrecompute(Graph, OriginId, targetCount, fullCharge, minimumSafeCharge)
    // initialize data structures
    TargetList.clear( )
    PriorityQueue.clear( )
    NodeSet.clear( )
    Origin = NodeSet.getNode(Graph,OriginId)
    Origin.cost = 0
    Origin.charge = fullCharge
    Origin.altTime = 0
    Origin.previous = NULL // signifies beginning of route, i.e., there is
    no previous node on the route
    PriorityQueue.insert(Origin) // sets Origin.inQueue = true
    // search nodes in order of cost
    While ( PriorityQueue.isEmpty( ) is false)
        Node = PriorityQueue.top( )
        Node.settled = true // getNode sets settled to false when node is
        first encountered
        If ( Node.target is true)
            TargetList.add(Node)
            If (TargetList.size( ) equals targetCount) // this check is
            optional - the algorithm will terminate remaining targets are out
            of range
                Return TargetList
        Links = Graph.getLinks(Node.id)
        For ( i = 0; i < Links.count( ); i = i+1 )
            id = Links[i].nextId
            NextNode = NodeSet.getNode(Graph,id)
            If ( NextNode.inQueue is true )
                If (NextNode.cost > Links[i].cost + Node.cost )
                    PriorityQueue.remove(NextNode)
                    NextNode.previous = pointer to Node // links nodes on
                    route back to origin
                    NextNode.cost = Links[i].cost + Node.cost
                    NextNode.charge = Node.charge − Links[i].consumed
                    NextNode.altTime = Node.altTime + Links[i].time
                    If (NextNode.charge > minimumSafeCharge)
                        PriorityQueue.insert(NextNode) // sets
                        NextNode.inQueue = true
            Else if ( NextNode.settled is false )
                NextNode.previous = pointer to Node // links nodes on
                route
                back to origin
                NextNode.cost = Links[i].cost + Node.cost
                NextNode.charge = Node.charge − Links[i].consumed
                NextNode.altTime = Node.altTime + Links[i].time
                If (NextNode.charge > minimumSafeCharge)
                    PriorityQueue.insert(NextNode)
    // cannot find all target locations
    Return TargetList
```

The pseudo code 1 and the pseudo codes that follow can be implemented in software, firmware, hardware, of a combination thereof. The pseudo codes describes the logic of the invention in exemplary form can be implemented in hardware description language, such as Verilog™ or VHDL™ and then synthesized to form hardware and logic circuits.

The following table defines the mapping between the pseudo code and the specification elements. The table will be denoted as Table 1:

| Pseudo Code Parameters | Specification Elements |
|---|---|
| Graph | Geographic information for the start location 204, the replenishment location 210, the intermediate stop 208, and the destination 206 |
| Origin | The start location 204 |
| Origin.charge = fullCharge | The current location estimated level 216 of FIG. 2 at full capacity at the start location 204 |
| Links | The travel section 212 |
| Node | e.g., the replenishment location 210 |
| NextNode | Next stopping point: e.g., the first replenishment location 302 of FIG. 2. |
| cost | e.g., the estimated sectional travel time 234 of FIG. 2; the estimated sectional financial cost 236 of FIG. 2, or the combination thereof |
| charge | The estimated arrival level 218, the current location estimated level 216, or the combination thereof |
| Links[i].consumed | The estimated consumption level 226 of FIG. 2 |
| minimumSafeCharge | The predetermined arrival level 220 |
| TargetList | e.g., the first replenishment location 302 of FIG. 3; the first intermediate stop 312 of FIG. 3; the destination 206 of FIG. 2. or the combination thereof |

The pre-computation module 506 can include an initializer pre-computation submodule 602. The initializer pre-computation submodule 602 includes the following functions to initialize the data structures used in pseudo code 1:

```
TargetList.clear( )
PriorityQueue.clear( )
NodeSet.clear( )
Origin = NodeSet.getNode(Graph,OriginId)
Origin.cost = 0
Origin.charge = fullCharge
Origin.altTime = 0
Origin.previous = NULL
PriorityQueue.insert(Origin)
```

For example, the "Graph" is defined as a data structure that represents the geographic information for the geographic region where the user's vehicle can travel. "Graph" can be referred as Graph or graph going forward.

A map can provide the geographic information on the graph. A "Node" is defined as the data structure representing the stopping points, such as the start location 204, the replenishment location 210, the intermediate stop 208, the destination 206, or the combination thereof on the graph. "Node" can be referred as Node or node going forward. The node can include the "Origin," and the "NextNode."

The "PriorityQueue" is defined as a data structure representing a list of nodes discoverable by the pre-computation module 506 on the graph. The "PriorityQueue.clear( )" removes the node from the list so that the list is empty.

"NodeSet" is defined as a data structure that records the node that have been encountered by a search performed by the pre-computation module 506 based on the identification (ID) in the graph. Each node can have a unique ID to allow the pre-computation module 506 to identify the node. For example, the ID for the first replenishment location 302 can be "first" of the first replenishment location 302. "NodeSet.clear( )" removes the node from the "NodeSet."

The "TargetList" is defined as a data structure representing a list of nodes for the start location 204, the replenishment location 210, the intermediate stop 208, the destination 206, or the combination thereof selected by the pre-computation module 506 from the graph. The "TargetList.clear( )" initializes the "TargetList" by clearing the data structure.

The "Origin" is defined as a data structure representing the start location 204. "NodeSet.getNode( )" is defined as a function to identify the stopping point and return a node from the graph. For a more specific example, the "Graph" and "OriginId" are inputs for the function "NodeSet.getNode( )"

The "OriginId" is defined as the ID for the start location 204. For example, "NodeSet.getNode(Graph,OriginId)" can return the node representing the start location 204 from the graph based on the "OriginId."

The field is defined as a set of elements for the "Node," "Origin," and "NextNode." An element is defined as the characteristic of the stopping points. "NextNode" is defined as a data structure representing the next stopping point. If a field is introduced without specifying either the "Node," "Origin," or "NextNode," the field is shared by the "Node," "Origin," and "NextNode." However, if the field is specific to the data structure, the field will be introduced with a specific data structure. For example, "charge" is defined as a field for the "Node." The details regarding the "NextNode" will be discussed later.

A "cost" is defined as a field representing the estimated sectional travel time 234, the estimated sectional financial cost 236, or the combination thereof "Origin.cost" is defined as the data structure for the estimated sectional travel time 234, the estimated sectional financial cost 236, or the combination thereof at the start location 204. Here, "Origin.cost=0" can set the "Origin.cost" to "0," because no "cost" is incurred when the vehicle is still at the "Origin." A travel cost can represent the estimated sectional travel time 234, the estimated sectional financial cost 236, or the combination thereof.

A "charge" is defined as a field for the "Node" for the amount of resource, fuel, or the combination thereof that would remain after traveling the travel route 214 from the start location 204 to the next stopping point. "fullCharge" is defined as the resource, fuel, or the combination thereof being full capacity. For example, "Origin.charge=fullCharge" can represent that the current location estimated level 216 at the start location 204 for the resource, fuel, or the combination thereof being at full capacity.

The variable "previous" is defined as a field or a pointer to the previous node. "Origin.previous=NULL" can signify that the vehicle is at the start location 204. "PriorityQueue.insert (Origin)" can add the "Origin" in the "PriorityQueue" as the first node.

The pre-computation module 506 can include a priority queue pre-computation submodule 604 and is coupled to the initializer pre-computation submodule 602. The priority queue pre-computation submodule 604 establishes a condition for the pre-computation module 506 to search for the stopping points, such as the replenishment location 210, the intermediate stop 208, or the combination thereof. For example the priority queue pre-computation submodule 604 includes the following function from pseudo code 1:

While (PriorityQueue.is Empty( ) is false)

The priority queue pre-computation submodule 604 is shown as a decision box having a logical path that is either "YES" or "NO" for invoking the next submodule. The invoking of the submodule is defined as moving along the logical path to the next submodule and executing the next submodule.

For example, if the condition for the priority queue pre-computation submodule 604 is met, a logical path for "YES"

will be chosen and an incomplete pre-computation submodule 634 can be invoked. If the condition for the priority queue pre-computation submodule 604 is not met, a logical path for "NO" will be chosen and a settled pre-computation submodule 606 can be invoked. Throughout this specification going forward, a submodule that is a decision box is illustrated with a diamond shape. If a submodule is not a decision box, the submodule can be illustrated in a shape other than the diamond shape.

For a further example, "While (PriorityQueue.is Empty( ) is false)" can establish the condition whether the "PriorityQueue" is empty or not. If the "PriorityQueue" is empty, the incomplete pre-computation submodule 634 can be invoked from the priority queue pre-computation submodule 604. The details regarding the incomplete pre-computation submodule 634 will be discussed later.

At the first invocation of the priority queue pre-computation submodule 604, the "PriorityQueue" is defined as not empty if the "PriorityQueue.insert(Origin)" successfully adds the "Origin" in the "PriorityQueue" as the first node. While the "PriorityQueue" is not empty, the settled pre-computation submodule 606 can be invoked.

The pre-computation module 506 can include the settled pre-computation submodule 606 and is coupled to the priority queue pre-computation submodule 604. The settled pre-computation submodule 606 identifies the "Node" or the stopping point with the lowest value for the estimated sectional travel time 234, the estimated sectional financial cost 236, or the combination thereof. For example, the settled pre-computation submodule 606 includes the following functions from pseudo code 1:

---
Node = PriorityQueue.top( )"
Node.settled = true
---

"PriorityQueue.top( )" extracts the "Node" with the lowest value for the estimated sectional travel time 234, the estimated sectional financial cost 236, or the combination thereof in the "PriorityQueue." At the very first invocation of the settled pre-computation submodule 606, the "PriorityQueue" can only include the "Origin." The "PriorityQueue.top( )" will extract the "Origin," from the "PriorityQueue" and sets the "inQueue" for the "Origin" to "false."

"inQueue" is a field representing the condition whether the "Origin," "Node," or "NextNode" is in the "PriorityQueue." If the "inQueue" is set to "false," the "Node" for example, is no longer in the "PriorityQueue." If the "inQueue" is set to "true," the "Node" for example, is in the "PriorityQueue."

"Node=PriorityQueue.top( )" represents assigning of the return value for "PriorityQueue.top( )" to the "Node." For the very first invocation, the "Origin" will be assigned as the "Node." The details regarding "PriorityQueue.top( )" extracting and assigning of the "Node" other than the "Origin" will be discussed later.

"settled" is defined as a field to determine whether the lowest value for the estimated sectional travel time 234, the estimated sectional financial cost 236, or the combination thereof had been found by the pre-computation module 506. "Node.settled=true" represents a data structure for the "Node" having the lowest value for the estimated sectional travel time 234, the estimated sectional financial cost 236, or the combination thereof had been found by the pre-computation module 506.

As discussed previously, at the first invocation of the settled pre-computation submodule 606, "PriorityQueue.top( )" can extract the "Origin." Since there is no value for the estimated sectional travel time 234, the estimated sectional financial cost 236, or the combination thereof at the "Origin," "Node.settled" will be set as "true" if "PriorityQueue.top( )" returns the "Origin." However, once the pre-computation module 506 executes "NextSet.getNode( )" "Node.settled" will be set as "false." The details regarding "Node.settled=true" determining the "Node" having the lowest value for the estimated sectional travel time 234, the estimated sectional financial cost 236, or the combination thereof other than the "Origin" will be discussed later. The details regarding the execution of "NextSet.getNode( )" will be discussed later.

The pre-computation module 506 can include a target determinator pre-computation submodule 608 and is coupled to the settled pre-computation submodule 606. The target determinator pre-computation submodule 608 identifies whether the condition that a node is one of the stopping points that can be the target location 238 has been met or not. For example, the target determinator pre-computation submodule 608 includes the following function to identify the condition in pseudo code 1:

If (Node.target is true)

"target" is defined as a field for the node to be determine whether the node can be one of the stopping points that can be the target location 238 or not. If "target" is set to "true," "NodeSet.getNode" can return the node to be included in the target location 238. Furthermore, if "target" is "true," the pre-computation module 506 can invoke an aggregator pre-computation submodule 610. Details regarding the aggregator pre-computation submodule 610 will be discussed later.

If "target" is set to "false," the node cannot be included in the target location 238. The pre-computation module 506 can invoke a get-link pre-computation submodule 614.

The get-link pre-computation submodule 614 is coupled to the target determinator pre-computation submodule 608. The get-link pre-computation submodule 614 identifies the path from one stopping point to another. For example, the path can include the travel section 212 of FIG. 2 between the start location 204 to the first replenishment location 302. For a further example, the get-link pre-computation submodule 614 includes the following function to identify the path as described in pseudo code 1:

Links="Graph.getLinks(Node.id)

"Links" is defined as an array representing a number of paths originating from that one stopping point. For example, the travel section 212 can originate from the start location 204 to the first intermediate stop 312.

A node can have multiple numbers of "Links" originating from the same node. For example, the start location 204 can have two paths of the travel section 212 originating from the start location 204. For a further example, "Links" from the start location 204 can include the travel section 212 to the first replenishment location 302 and the travel section 212 to the first intermediate stop 312.

"Links" can have the following fields: "cost" and "nextId." "Links cost" is defined as a data structure representing the estimated sectional travel time 234, the estimated sectional financial cost 236, or the combination thereof for traveling the "Links." The "nextId" is defined as a field that represents the ID for the next stopping point following the current "Node."

"id" is defined as a field for the identification (ID). "Graph.getLinks(Node.id)" can identify the "Links" associated with the "Node" from the "Graph." If the "Node" is not in the "NodeSet," thus, the pre-computation module 506 has yet to encounter the "Node," "getLinks( )" can also create a "Node," set all the fields for the "Node," and include the "Node" in the "NodeSet."

"Links=Graph.getLinks(Node.id)" can represent the get-link pre-computation submodule 614 assigning the paths associated with that "Node.id" to the "Links" For example, "Graph.getLinks(Node.id)" can identify the path originating from the start location 204. For a more specific example, the "Links" for the start location 204 can represent the travel section 212 to the first replenishment location 302 and the travel section 212 to the first intermediate stop 312.

The pre-computation module 506 can include a link-counter pre-computation submodule 616 and is coupled to the get-link pre-computation submodule 614. The link-counter pre-computation submodule 616 establishes a condition for the pre-computation module 506 to search for the stopping points, such as the replenishment location 210, with the lowest value for the estimated sectional travel time 234, the estimated sectional financial cost 236, or the combination thereof. For example, the link-counter pre-computation submodule 616 includes the following function to establish the condition:

For (i=0; i<Links.count( ); i=i+1)

"Links.count( )" computes the number of paths that "Links" can have. From the previous example, the start location 204, "Links.count( )" can return "two" as the number of paths originating from the start location 204.

"i" represents the position within the array representing the "Links." For example, the first position of the array is signified as "0." "i=0" signifies that "i" is positioned at the first position of the array. For this example, "i=0" signifies that "i" is positioned at the first position of the "Links" "i++" represents a function to move the position of "i" to the next position along the array. For example, the "Links" for the start location 204 can have the travel section 212 to the first replenishment location 302 and the travel section 212 to the first intermediate stop 312 in order. For a more specific example, "i=0" can represent the travel section 212 to the first replenishment location 302 as the first position of the "Links" "i++" can move "i" to "i=1." "i=1" can represent the travel section 212 to the first intermediate stop 312 for the second portion of the "Links."

For a further example, "For (i=0; i<Links count( ); i=i+1)" can establish the condition to search for the lowest value for the estimated sectional travel time 234, the estimated sectional financial cost 236, or the combination thereof while "Links.count( )" can compute for the "Links." More specifically, until "For (i=0; i<Links.count( ); i=i+1)" can no longer increment the "i," the pre-computation module 506 can continue to invoke the link-counter pre-computation submodule 616.

If "Links.count( )" can compute for "Links," the pre-computation module 506 can invoke a get-node pre-computation submodule 618. If "Links.count( )" cannot compute for "Links," the pre-computation module 506 can invoke the priority queue pre-computation submodule 604. The details regarding the get-node pre-computation submodule 618 will be discussed later.

The pre-computation module 506 can include the get-node pre-computation submodule 618 and is coupled to the link-counter pre-computation submodule 616. The get-node pre-computation submodule 618 identifies the candidate for the next stopping point based on the path available in the "Links." For example, the get-node pre-computation submodule 618 includes the following functions to identify the candidate for the next stopping point as described in pseudo code 1:

id = Links[i].nextId
NextNode = NodeSet.getNode(Graph,id)

"id=Links[i].nextId" sets the "id" based on the next stopping point after traversing the path available in the "Links[i]." For example, "i" can be "0." For a further example, "Links [0]" can represent the travel section 212 from the start location 204 to the first replenishment location 302. The next stopping point after traversing the travel section 212 can be the first replenishment location 302. "Links[i].nextId" can represent a data structure for indicating the direction that a "Links[i]" or the path is heading towards. For example, "Links[0].nextId" can head towards the first replenishment location 302. The get-node pre-computation submodule 618 can execute "id=Links[i].nextId" to set the "id" for the first replenishment location 302.

"NodeSet.getNode(Graph,id)" returns the "Node" having the "id" to be assigned for the "NextNode." For example, "id" can represent the ID for the first replenishment location 302. NodeSet.getNode(Graph,id)" can return the "Node" for the first replenishment location 302. "NextNode=NodeSet.getNode(Graph,id)" can set the first replenishment location 302 as the "NextNode." The pre-computation module 506 can continue to invoke the get-node pre-computation submodule 618 until the link-counter pre-computation submodule 616 can no longer increment the "i" for "Links."

The pre-computation module 506 can include an in-queue pre-computation submodule 620 and is coupled to the get-node pre-computation submodule 618. The in-queue pre-computation submodule 620 identifies whether the condition that the "NextNode" is in the "PriorityQueue" has been met or not. For example, the in-queue pre-computation submodule 620 includes the following functions to identify the condition as described in pseudo code 1:

If ( NextNode.inQueue is true )
Else if ( NextNode.settled is false )

At the very first invocation of the in-queue pre-computation submodule 620, the "NextNode" will not be in the "PriorityQueue." Subsequently, the condition for "If (NextNode.inQueue is true)" will not be met and the in-queue pre-computation submodule 620 can check whether the condition for "Else if (NextNode.settled is false)" is met or not.

As discussed earlier, the execution of "NodeSet.getNode ( )" sets the "settled" to "false." Previously, the get-node pre-computation submodule 618 executed "NodeSet.getNode(Graph,id)" for the "NextNode." Subsequently, "NextNode.settled" can be set to "false."

For example, by invoking "NodeSet.getNode(Graph,id)," the pre-computation module 506 can assume that a "Node" has at least one of the "Links" originating from that "Node." Furthermore, the pre-computation module 506 can assume that the lowest value for the estimated sectional travel time 234, the estimated sectional financial cost 236, or the combination thereof had not been found. Subsequently, "NodeSet.getNode(Graph,id)" sets the "settled" for the "NextNode" as "false." Therefore, the very first invocation of the in-queue pre-computation submodule 620 can meet the condition for "Else if (NextNode.settled is false)."

By meeting the condition for "Else if (NextNode.settled is false)," the pre-computation module 506 can invoke a calculator pre-computation submodule 622. The details regarding the calculator pre-computation submodule 622 will be discussed later.

As a contrast to the very first invocation, if the "NextNode.inQueue" is "true," thus the condition for "If (NextNode.inQueue is true)" is met, the pre-computation module 506 can invoke a cost pre-computation submodule 624. The details regarding the cost pre-computation submodule 624 will be discussed later.

The pre-computation module 506 can include the calculator pre-computation submodule 622 and is coupled to the in-queue pre-computation submodule 620. The calculator pre-computation submodule 622 calculates the "cost" for traveling to the next stopping point. For example, the calculator pre-computation submodule 622 can calculate the estimated sectional travel time 234, the estimated sectional financial cost 236, or the combination thereof for traversing the travel section 212.

The calculator pre-computation submodule 622 also calculates the estimation for the amount of resource, fuel, or the combination thereof remaining when reaching the next stopping point. For example, the calculator pre-computation submodule 622 can calculate the estimated arrival level 218 for arriving at one or more of the stopping points after traversing the travel section 212. For a further example, the calculator pre-computation submodule 622 can calculate the estimated arrival level 218 for arriving at the replenishment location 210, the destination 206, the intermediate stop 208, or the combination thereof.

The calculator pre-computation submodule 622 also calculates the estimation for the amount of resource, fuel, or the combination available before continuing on with the trip. For example, the calculator pre-computation submodule 622 can calculate the current location estimated level 216 at the replenishment location 210, the destination 206, the intermediate stop 208, or the combination thereof. For a further example, the calculator pre-computation submodule 622 can calculate the current location estimated level 216 at the first replenishment location 302.

The calculator pre-computation submodule 622 also calculates the estimation for the amount of time required to reach the next stopping point traveling on a vehicle other than the user's vehicle. For example, the calculator pre-computation submodule 622 can calculate the estimated alternate transportation time 230 for traversing the alternate transportation route 228 of FIG. 2 to reach the replenishment location 210, the destination 206, the intermediate stop 208, or the combination thereof.

The calculator pre-computation submodule 622 includes the following functions to calculate the estimated sectional travel time 234, the estimated sectional financial cost 236, the estimated arrival level 218, the current location estimated level 216, and the estimated alternate transportation time 230 as described from pseudo code 1:

```
NextNode.previous = pointer to Node
NextNode.cost = Links[i].cost + Node.cost
NextNode.charge = Node.charge − Links[i].consumed
NextNode.altTime = Node.altTime + Links[i].time
```

"NextNode.previous=pointer to Node" sets the pointer to the previous stopping point. For example, the "NextNode" can be the second replenishment location 304 of FIG. 3. "NextNode.previous" can represent the first replenishment location 302.

"NextNode.cost" is defined as the aggregation of the "cost" for traveling along the path to reach the next stopping point. For example, "NextNode.cost" can represent the aggregation of the estimated sectional travel time 234, the estimated sectional financial cost 236, or the combination thereof for reaching the next stopping point from the start location 204 or the "Origin."

The calculator pre-computation submodule 622 can calculate the "NextNode.cost" by aggregating the "Links[i].cost" and "Node.cost." For a further example, "Links[i].cost" can represent the estimated sectional travel time 234, the estimated sectional financial cost 236, or the combination thereof for traveling the path to reach the next stopping point from the current stopping point. For a more specific example, "Links[0].cost" can represent the estimated sectional travel time 234, the estimated sectional financial cost 236, or the combination thereof for traveling the travel section 212 from the first replenishment location 302, the current stopping point, to the second replenishment location 304, the next stopping point.

"Node.cost" can represent the aggregation of the estimated sectional travel time 234, the estimated sectional financial cost 236, or the combination thereof for traveling the path to reach the current stopping point from the "Origin." For example, the current stopping point or the "Node" can be the first replenishment location 302. "Node.cost" can represent the aggregation of the estimated sectional travel time 234, the estimated sectional financial cost 236, or the combination thereof for traveling the travel section 212 from the start location 204 to reach the first replenishment location 302. Subsequently, "NextNode.cost" can represent the aggregation of the estimated sectional travel time 234, the estimated sectional financial cost 236, or the combination thereof for the travel section 212 from the start location 204 to the first replenishment location 302 and the travel section 212 from the first replenishment location 302 to the second replenishment location 304.

"NextNode.charge" can represent the estimated arrival level 218 for reaching the next stopping point or the "NextNode." For example, the "NextNode.charge" can represent the estimated arrival level 218 after arriving at the second replenishment location 304 from the first replenishment location 302. The calculator pre-computation submodule 622 can calculate the "NextNode.charge" by subtracting the "Links[i].consumed" from the "Node.charge."

"Node.charge" is defined as the amount of resource, fuel, or the combination thereof at the stopping point. For example, "Node.charge" can represent the current location estimated level 216 representing an electric charge for the electric vehicle when the vehicle was at the first replenishment location 302. For a further example, the current location estimated level 216 at the first replenishment location 302 can be 100% of full battery capacity.

The estimated consumption level 226 or "Links[i].consumed" is defined as the estimation of the resource, fuel, or the combination thereof required by the vehicle for traveling the path. For example, "Links[0].consumed" can represent the estimated consumption level 226 for traveling the travel section 212 from the first replenishment location 302 to the second replenishment location 304 or the "NextNode." For a further example, the calculator pre-computation submodule 622 can calculate the estimated consumption level 226 for traversing the travel section 212. More specifically, the estimated consumption level 226 can be 75% of the full battery capacity.

The "NextNode.charge" can represent the estimated arrival level 218 when the vehicle reaches the second replenishment location 304. The calculator pre-computation submodule 622 can calculate the "NextNode.charge" by subtracting the Links[i].consumed from the "Node.charge." For this example, "NextNode.charge" or the estimated arrival level 218 after arriving at the second replenishment location 304 can be 25% of full battery capacity.

"altTime" is defined as a field for the "Node" representing the estimation of the time that the user can accumulate on the alternate transportation route 228. For example, "altTime" can represent the aggregation of the estimated alternate transportation time 230 for traveling along the alternate transportation route 228.

"time" is defined as a filed for the "Links" representing the estimation of the time that the user can take to travel the length of the path. For further definition, "time" can be the same as the "cost." For example, "time" can represent the estimated sectional travel time 234.

The "NextNode.altTime" is defined as the time accumulated on the alternate transportation route 228 to reach the "NextNode." For example, the "Node" can be the second intermediate stop 314 and the "NextNode" can be the destination 206. For a further example, "Links[1]" can represent the travel section 212 from the second intermediate stop 314 of FIG. 3 to the destination 206 of FIG. 2. The travel section 212 can be the alternate transportation route 228 for reaching the destination 206 or the "NextNode." "Links[1].time" can represent the time user can spend on traveling the travel section 212. "Links [1].time" can be 40 minutes.

The calculator pre-computation submodule 622 can execute "Node.altTime+Links[i].time" to calculate the "NextNode.altTime." For example, the travel section 212 from the third replenishment location 306 of FIG. 3 to the second intermediate stop 314 and the travel section 212 from the second intermediate stop 314 to the destination 206 can represent the alternate transportation route 228. The estimated alternate transportation time 230 for traveling the travel section 212 from the third replenishment location 306 to the second intermediate stop 314 can be 70 minutes. From the previous example, "Links [1].time" can be 40 minutes to travel the travel section 212 from the second intermediate stop 314 to the destination 206. The aggregation of the estimated alternate transportation time 230 or "NextNode.altTime" for traveling the two paths of the travel section 212 can be 110 minutes.

The pre-computation module 506 can include a safe charge pre-computation submodule 628 and is coupled to the calculator pre-computation submodule 622. The safe charge pre-computation submodule 628 identifies whether the condition that the estimation of resource, fuel, or the combination thereof for arriving at the next stopping point will be greater than the minimum threshold allowed by the navigation system 100 has been met or not. For example, the safe charge pre-computation submodule 628 can identify whether the estimated arrival level 218 for reaching the second replenishment location 304 will be greater than the predetermined arrival level 220 generated by the predetermined level module 502 of FIG. 5. For a further example, the safe charge pre-computation submodule 628 includes the following function to identify the condition, as described from pseudo code 1:

If (NextNode.charge>minimumSafeCharge)

"minimumSafeCharge" is defined as the minimum threshold allowed by the navigation system 100 for planning the travel route 214 to reach the next stopping point. For example, the "minimumSafeCharge" can represent the predetermined arrival level 220.

Continuing from the example, the "NextNode.Charge" or the estimated arrival level 218 after arriving at the second replenishment location 304 can be 25% of full battery capacity. The predetermined level module 502 can generate the predetermined arrival level 220 to be 5%. Since the estimated arrival level 218 after arriving at the second replenishment location 304 can exceed the predetermined arrival level 220, the safe charge pre-computation submodule 628 can identify that the vehicle can travel along the travel section 212 from the first replenishment location 302 to the second replenishment location 304 and meet the condition for If (NextNode.charge>minimumSafeCharge).

By meeting the condition for If (NextNode.charge>minimumSafeCharge), the pre-computation module 506 can invoke an insert pre-computation submodule 630. If the estimated arrival level 218 is less than the minimum fuel level, thus, failing to meet the condition for If (NextNode.charge>minimumSafeCharge), the pre-computation module 506 cannot invoke the insert pre-computation submodule 630. The details regarding the insert pre-computation submodule 630 will be discussed later.

The safe charge pre-computation submodule 628 can include an additional condition. For example, in addition to "NextNode.charge>minimumSafeCharge," the safe charge pre-computation submodule 628 can include "NextNode.altTime is no greater than maxAltTime."

"maxAltTime" is defined as the maximum amount of time found to be reasonable for the user to travel on the alternate transportation route 228. For example, the safe charge pre-computation submodule 628 can calculate the allotted alternate transportation travel time 232 of FIG. 2 for traversing the alternate transportation route 228 to reach the replenishment location 210, the destination 206, the intermediate stop 208, or the combination thereof. For a further example, the "maxAltTime" can represent the allotted alternate transportation travel time 232.

From the previous example, "NextNode" can be the destination 206. The "NextNode.altTime" can be 110 minutes. The allotted alternate transportation travel time 232 can be 120 minutes. Since the "NextNode.altTime" is less than the "maxAltTime," the condition for "NextNode.altTime is no greater than maxAltTime" can be met.

The pre-computation module 506 can include the insert pre-computation submodule 630 and is coupled to the safe charge pre-computation submodule 628. The insert pre-computation submodule 630 adds the next stopping point into the "PriorityQueue" by the following function, from pseudo code 1:

PriorityQueue.insert(NextNode)

For example, the insert pre-computation submodule 630 add the second replenishment location 304 to the "PriorityQueue" by executing "PriorityQueue.insert(NextNode)" and setting the "inQueue" field for the "NextNode" as "true." The insert pre-computation submodule 630 can invoke the link-counter pre-computation submodule 616 after executing the "PriorityQueue.insert(NextNode)." Continuing with the previous example, the pre-computation module 506 can re-invoke the in-queue pre-computation submodule 620, because the insert pre-computation submodule 630 added the "NextNode" in the "PriorityQueue." The in-queue pre-computation submodule 620 can invoke the cost pre-computation submodule 624 if the condition for "If (NextNode.inQueue is true)" is met.

The pre-computation module 506 can include the cost pre-computation submodule 624 and is coupled to the in-queue pre-computation submodule 620. The cost pre-computation submodule 624 compares the "NextNode.cost" between the "Links" to establish the condition to maintain the search for the lowest "NextNode.cost" or the lowest value for the estimated sectional travel time 234, the estimated sectional financial cost 236, or the combination thereof.

For example, the cost pre-computation submodule 624 can compare the estimated sectional travel time 234, the estimated sectional financial cost 236, or the combination thereof for each of the paths representing the travel section 212. For a further example, the cost pre-computation submodule 624 can compare the "NextNode.cost" between traveling from the start location 204 to the first replenishment location 302 versus traveling from the start location 204 to the first intermediate stop 312. The cost pre-computation submodule 624 includes the following function to compare and establish the condition, as found in pseudo code 1.

If (NextNode.cost>Links[i].cost+Node.cost)

For a specific example, "Links count( )" can be two. "NextNode.cost" here can represent the "NextNode.cost" for the "NextNode" already in the "PriorityQueue." For a further example, the "NextNode.cost" can represent the aggregation of the estimated sectional travel time 234, the estimated sectional financial cost 236, or the combination thereof for "Links[0]" or reaching the first replenishment location 302.

"Links[i].cost+Node.cost" here invoked in the cost pre-computation submodule 624 can represent the aggregation of the estimated sectional travel time 234, the estimated sectional financial cost 236, or the combination thereof for, as an example, "Links[1]" or the "NextNode" not in the "PriorityQueue." For this example, "Node.cost" can represent the "Origin.cost" or "0." For a further example, "Links[1].cost+Node.cost" can represent the aggregation of the estimated sectional travel time 234, the estimated sectional financial cost 236, or the combination thereof for reaching the first intermediate stop 312.

Continuing with the example, if the aggregation for the estimated sectional travel time 234, the estimated sectional financial cost 236, or the combination thereof for "Links[0]" is greater than "Links[1]," the pre-computation module 506 can invoke a remove pre-computation submodule 626. The invocation of the remove pre-computation submodule 626 can signify that the aggregation for the estimated sectional travel time 234, the estimated sectional financial cost 236, or the combination thereof is greater to reach the first replenishment location 302 than the first intermediate stop 312. In contrast, if the aggregation for the estimated sectional travel time 234, the estimated sectional financial cost 236, or the combination thereof for "Links[0]" is less than "Links[1]," the pre-computation module 506 can invoke the link-counter pre-computation submodule 616.

The pre-computation module 506 can include the remove pre-computation submodule 626 and is coupled to the cost pre-computation submodule 624. The remove pre-computation submodule 626 removes the "NextNode" already in the queue that failed to meet the condition specified in the cost pre-computation submodule 624. For example, the remove pre-computation submodule 626 includes the following function to remove the "NextNode" as found in pseudo code 1.

PriorityQueue.remove(NextNode)

Continuing from the previous example, if the aggregation for the estimated sectional travel time 234, the estimated sectional financial cost 236, or the combination thereof for "Links[0]" is greater than "Links[1]," the remove pre-computation submodule 626 can execute "PriorityQueue.remove (NextNode)" to remove the "NextNode" representing the first replenishment location 302. After the removal, the pre-computation module 506 can invoke the calculator pre-computation submodule 622 to set the "NextNode.cost" based on, for example, "Links[1].cost+Node.cost," because the aggregation for the estimated sectional travel time 234, the estimated sectional financial cost 236, or the combination thereof reaching the first intermediate stop 312 can be less than the first replenishment location 302.

The pre-computation module 506 can include the aggregator pre-computation submodule 610 and is coupled to the target determinator pre-computation submodule 608. The aggregator pre-computation submodule 610 adds the "Node" having the "target" as "true" to the "TargetList." "TargetList" is defined as a data structure representing a list of stopping points discovered by the pre-computation module 506 that can be selected in the target location 238.

For example, the aggregator pre-computation submodule 610 can select the replenishment location 210, the intermediate stop 208, the destination 206, or the combination thereof based on the estimated arrival level 218 meeting or exceeding the predetermined arrival level 220. By having the estimated arrival level 218 meeting or exceeding the predetermined arrival level 220, the current location estimated level 216 can meet or exceed the estimated consumption level 226. Subsequently, the aggregator pre-computation submodule 610 can select the replenishment location 210, the intermediate stop 208, the destination 206, or the combination thereof based on the current location estimated level 216 meeting or exceeding the estimated consumption level 226.

Additionally, by meeting the condition for "NextNode.altTime is no greater than maxAltTime," the aggregator pre-computation submodule 610 can select the replenishment location 210, the intermediate stop 208, the destination 206, or the combination thereof based on the allotted alternate transportation travel time 232 meeting or exceeding the estimated alternate transportation time 230. After the invocation of the cost pre-computation submodule 624, the aggregator pre-computation submodule 610 can select the replenishment location 210, the intermediate stop 208, the destination 206, or the combination thereof with the shortest of the estimated sectional travel time 234, with the lowest of the estimated sectional financial cost 236, or the combination thereof for traversing each of the paths representing the travel section 212.

For example, the aggregator pre-computation submodule 610 includes the following function to add the "Node" as shown from pseudo code 1:

TargetList.add(Node)

The aggregator pre-computation submodule 610 can execute TargetList.add(Node) to add a "Node" representing the replenishment location 210, which can be one out of many, to the "TargetList." The pre-computation module 506 can invoke a target count pre-computation submodule 612 once the "Node" is added to the "TargetList."

The pre-computation module 506 can include the target count pre-computation submodule 612 and is coupled to the aggregator pre-computation submodule 610. The target count pre-computation submodule 612 identifies whether the condition that the size of the "TargetList" equals the "targetCount." For example, the aggregator pre-computation submodule 610 includes the following function to identify the condition, also found in pseudo code 1:

If (TargetList.size( ) equals targetCount)

The pre-computation module 506 can include a return pre-computation submodule 632 and is coupled to the target count pre-computation submodule 612. The return pre-computation submodule 632 returns the list of stopping points. For example, the return pre-computation submodule 632 can generate the target location 238 based on the estimated arrival level 218 meeting or exceeding the predetermined arrival level 220. For a further example, the return pre-computation submodule 632 includes the following function, as shown in pseudo code 1:

Return TargetList

For a specific example, "TargetList" can include the first replenishment location 302, the second replenishment location 304, the third replenishment location 306, the second intermediate stop 314, and the destination 206. The first replenishment location 302, the second replenishment location 304, the third replenishment location 306, the second intermediate stop 314, and the destination 206 can represent the stopping points for the vehicle to safely stop by without running out of resource, fuel, or the combination thereof.

The pre-computation module 506 can include the incomplete pre-computation submodule 634 and is coupled to the priority queue pre-computation submodule 604. The incomplete pre-computation submodule 634 returns the incomplete list of the stopping points if the condition for the priority queue pre-computation submodule 604 is not met. For example, the incomplete pre-computation submodule 634 includes the following function:

Return TargetList

The physical transformation from calculating the estimated arrival level 218, the current location estimated level 216, the estimated consumption level 226, the estimated alternate transportation time 230, the estimated sectional travel time 234, the estimated sectional financial cost 236, or the combination thereof results in movement in the physical world, such as people using the first device 102 of FIG. 1, the vehicle, or a combination thereof, based on the operation of the navigation system 100. As the movement in the physical world occurs, the movement itself creates additional information that is converted back to generate the target location 238 for the continued operation of the navigation system 100 and to continue the movement in the physical world.

It has been discovered that the present invention provides the navigation system 100 to generate the target location 238 for reducing the number of nodes that need to be considered in order to generate the travel route 214 by the navigation system 100. Routes representing the travel section 212 between the start location 204, the replenishment location 210, the intermediate stop 208, the destination 206, or the combination thereof can be computed in advance for producing the simplified graph with far fewer nodes. The generation of the target location 238 having the nodes pre-computed can aid by permitting the navigation system 100 to generate the travel route 214 more rapidly and accurately for the safer operation of vehicle to reach the destination 206.

Figure 7:
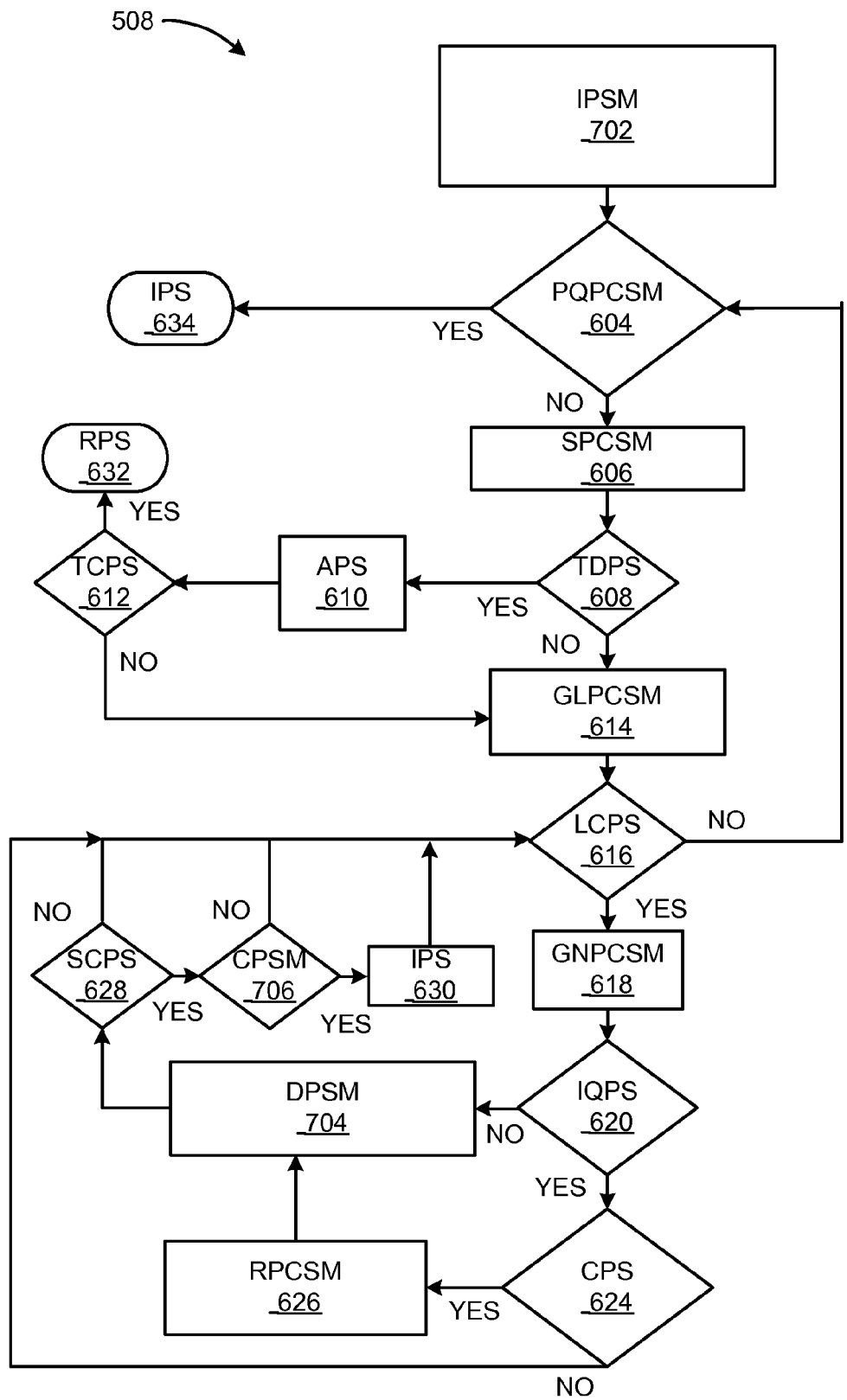
FIG. 7 is a flow of the pruning module.

Referring now to FIG. 7, therein is shown a flow of the pruning module 508. The pruning module 508 prunes unnecessary nodes that can be ignored. For example, the pruning module 508 can generate the target location 238 of FIG. 2 by selecting the replenishment location 210 of FIG. 2, the destination 206 of FIG. 2, the intermediate stop 208 of FIG. 2, or the combination thereof based on the section distance 222 of FIG. 2 meeting or exceeding the predetermined distance 224 of FIG. 2. The pruning module 508 can be shown in pseudo code format as in the following pseudo code 2:

```
Function RoutePrecompute(Graph, OriginId, targetCount, fullCharge,
minimumSafeCharge)
    // initialize data structures
    TargetList.clear( )
    PriorityQueue.clear( )
    NodeSet.clear( )
```

-continued

```
Origin = NodeSet.getNode(Graph,OriginId)
Origin.cost = 0
Origin.charge = fullCharge
Origin.altTime = 0
Origin.distance = 0
Origin.previous = NULL // signifies beginning of route, i.e., there is no
previous node on the route
PriorityQueue.insert(Origin) // sets Origin.inQueue = true
// search nodes in order of cost
While ( PriorityQueue.isEmpty( ) is false)
    Node = PriorityQueue.top( )
    Node.settled = true // getNode sets settled to false when node is first
    encountered
    If ( Node.target is true)
        TargetList.add(Node)
        If (TargetList.size( ) equals targetCount) // this check is optional -
        the algorithm will terminate remaining targets are out of range
            Return TargetList
    Links = Graph.getLinks(Node.id)
    For ( i = 0; i < Links.count( ); i = i + 1 )
        id = Links[i].nextId
        NextNode = NodeSet.getNode(Graph,id)
        If ( NextNode.inQueue is true )
            If (NextNode.cost > Links[i].cost + Node.cost )
                PriorityQueue.remove(NextNode)
                NextNode.previous = pointer to Node // links nodes on
                route back to origin
                NextNode.cost = Links[i].cost + Node.cost
                NextNode.charge = Node.charge – Links[i].consumed
                NextNode.altTime = Node.altTime + Links[i].time
                NextNode.distance = Node.distance + Links[i].distance
                If (NextNode.charge > minimumSafeCharge)
                    If ( NextNode.reach is not less than NextNode.distance
                    or not less than graph.minDistance(id) )
                        PriorityQueue.insert(NextNode) // sets
                        NextNode.inQueue = true
        Else if ( NextNode.settled is false )
            NextNode.previous = pointer to Node // links nodes on route
            back to origin
            NextNode.cost = Links[i].cost + Node.cost
            NextNode.charge = Node.charge – Links[i].consumed
            NextNode.altTime = Node.altTime + Links[i].time
            NextNode.distance = Node.distance + Links[i].distance
            If (NextNode.charge > minimumSafeCharge)
                If ( NextNode.reach is not less than NextNode.distance or
                not less than graph.minDistance(id) )
                    PriorityQueue.insert(NextNode)
// cannot find all target locations
Return TargetList
```

The following table defines the mapping between the pseudo code and the specification elements. The table will be denoted as Table 2:

| Pseudo Code Parameters | Specification Elements |
| --- | --- |
| distance | The section distance 222 |
| graph.minDistance(id) | The predetermined distance 224 |

The pruning module 508 can include the priority queue pre-computation submodule 604, the settled pre-computation submodule 606, the target determinator pre-computation submodule 608, and the get-link pre-computation submodule 614 with each having the same function, establishing the same condition, or the combination thereof as described in FIG. 6. The pruning module 508 can include the aggregator pre-computation submodule 610, the target count pre-computation submodule 612, the return pre-computation submodule 632, and the incomplete pre-computation submodule 634 with each having the same function, establishing the same condition, or the combination thereof as described in FIG. 6.

The pruning module 508 can include the link-counter pre-computation submodule 616, the get-node pre-computation submodule 618, the in-queue pre-computation submodule 620, and the cost pre-computation submodule 624 with each having the same function, establishing the same condition, or the combination thereof as described in FIG. 6. The pruning module 508 can include the remove pre-computation submodule 626, the safe charge pre-computation submodule 628, and the fifteenth pre-computation submodule with each having the same function, establishing the same condition, or the combination thereof as described in FIG. 6.

The pruning module 508 can include an initializer pruning submodule 702. The initializer pruning submodule 702 can include the same functions as the initializer pre-computation submodule 602 of FIG. 6 with the following modifications to initialize the data structures used in the pseudo code 2:

Origin.distance=0

"distance" is defined as a field for the node to determine the physical distance from the "Origin" to the node on the route computed to the node. For example, the "distance" can represent the section distance 222. Here, "Origin.distance" is set to "0," because no travel has been made by the vehicle.

The pruning module 508 can include a distance pruning submodule 704 and is coupled to the in-queue pre-computation submodule 620. The distance pruning submodule 704 calculates the length of path from one stopping point to another. For example, the distance pruning submodule 704 can calculate the section distance 222 of the travel section 212 of FIG. 2 for reaching the replenishment location 210, the intermediate stop 208, the destination 206, or the combination thereof. The distance pruning submodule 704 can include the same functions as the calculator pre-computation submodule 622 of FIG. 6 with the following modifications to initialize the data structures used in the pseudo code 2:

NextNode.distance=Node.distance+Links[i].distance

"NextNode.distance" can represent the aggregation of the section distance 222 from the start location 204 of FIG. 2 to the next stopping point. "Node.distance" can represent the aggregation of the section distance 222 from the start location 204 to the current stopping point. "Links[i].distance" can represent the section distance 222 of the path from the current stopping point to the next stopping point. "Links[i]" can signify that there can be more than one path representing the travel section 212 from the current stopping point to the next stopping point.

For example, "Node" can represent the first replenishment location 302 of FIG. 3. "Node.distance" can be 40 kilometers. "Links[i].distance" can represent the section distance 222 from the first replenishment location 302 to the "NextNode." For a more specific example, "Links[0].distance" can represent the section distance 222 for the travel section 212 from the first replenishment location 302 to the second replenishment location 304 of FIG. 3. "Links[0].distance" can be 50 kilometers. Subsequently, "NextNode.distance" can be 90 kilometers.

The pruning module 508 can include a conditional pruning submodule 706 and is coupled to the safe charge pre-computation submodule 628. The conditional pruning submodule 706 tests whether a path exists from the current location to the next stopping that is either less than the "NextNode.distance" or the predetermined distance 224. The conditional pruning submodule 706 includes the following function from the pseudo code 2 to determine whether the condition has been met or not:

If ( NextNode.reach is not less than NextNode.distance or not less than graph.minDistance(id))

"reach" is defined as a field for the node representing a reach bound of the node. "graph.minDistance(id)" is defined as a function to calculate the Euclidean distance from the "Node" to the "NextNode." For example, "graph.minDistance(id)" can calculate the predetermined distance 224.

For a further example, "Node" can represent the first intermediate stop 312 of FIG. 3. The predetermined distance 224 from the first intermediate stop 312 to the fourth replenishment location 308 of FIG. 3 can be 25 kilometers. However, the section distance 222 for the travel section 212 from the first intermediate stop 312 to the fourth replenishment location 308 can be 15 kilometers. Since the section distance 222 is less than the predetermined distance 224, the travel section 212 from the first intermediate stop 312 to the four the replenishment location 210 can be pruned. Subsequently, the pruning module 508 can avoid considering the travel section 212 by not selecting the travel section 212 to the target location 238. If the travel section 212 was the only path to arrive at the fourth replenishment location 308, the pruning module 508 can prune the fourth replenishment location 308 also.

In contrast, the predetermined distance 224 from the start location 204 to the first replenishment location 302 can be 35 kilometers. The section distance 222 from the start location 204 to the first replenishment location 302 can be 40 kilometers. The pruning module 508 can select the travel section 212 from the start location 204 to the first replenishment location 302 and the first replenishment location 302 for the target location 238. For example, the aggregator pre-computation submodule 610 can select the replenishment location 210, the intermediate stop 208, the destination 206, or the combination thereof based on the section distance 222 meeting or exceeding the predetermined distance 224.

The physical transformation from calculating the predetermined distance 224, the section distance 222, or the combination thereof results in movement in the physical world, such as people using the first device 102 of FIG. 1, the vehicle, or a combination thereof, based on the operation of the navigation system 100. As the movement in the physical world occurs, the movement itself creates additional information that is converted back to generate the target location 238 for the continued operation of the navigation system 100 and to continue the movement in the physical world.

It has been discovered that the present invention provides the navigation system 100 to generate the target location 238 for pruning the nodes that can be ignored to improve efficiency for the navigation system 100 to generate the travel route 214. Routes representing the travel section 212 that fall short of the predetermined distance 224 can be ignored to alleviate computation burden for consideration made by the navigation system 100 to generate the travel route 214. The generation of the target location 238 having the nodes pruned can aid by permitting the navigation system 100 to generate the travel route 214 more rapidly and accurately for the safer operation of vehicle to reach the destination 206.

Figure 8:
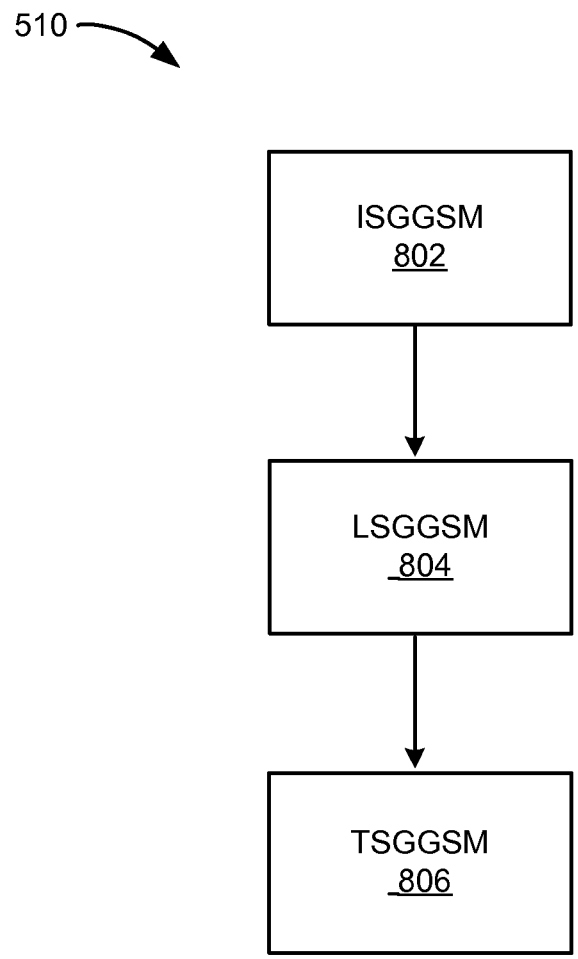
FIG. 8 is a flow of the simplified graph generator module.

Referring now to FIG. 8, therein is shown a flow of the simplified graph generator module 510. The simplified graph generator module 510 creates a simplified graph. The simplified graph generator module 510 can be shown in pseudo code format as in the following pseudo code 3:

```
PopulateWithShortcuts(Graph, OriginList, TargetListSize, NewGraph,
   fullCharge, minimumSafeCharge)
   For each Node in OriginList
      TargetNodeList = RoutePrecompute(Graph, Node, TargetListSize,
         fullCharge, minimumSafeCharge)
      For each TargetNode in TargetNodeList
         Create Link with
            Link.originId = Node.id
            Link.nextId = TargetNode.id
            Link.cost = TargetNode.cost
            Link.consumed = fullCharge - TargetNode.charge
```

```
Link.time = TargetNode.altTime // only needed when Graph is
    an alternate transportation network
Add Link to NewGraph as follows:
    Copy node with id Link.originId from Graph to NewGraph if not
        already copied
    Copy node with id Link.nextId from Graph to NewGraph if not
        already copied
    Create a link in NewGraph with the same field values as Link
```

The following table defines the mapping between the pseudo code and the specification elements. The table will be denoted as Table 3:

| Pseudo Code Parameters | Specification Elements |
|---|---|
| TargetNodeList | The target location 238 of FIG. 2 |

The simplified graph generator module 510 can include an initializer simplified graph generator submodule 802. The initializer simplified graph generator submodule 802 includes the following function to generate the target location 238 as used in pseudo code 3:

```
For each Node in OriginList
    TargetNodeList = RoutePrecompute(Graph, Node, TargetListSize,
        fullCharge, minimumSafeCharge)
```

"OriginList" is defined as a list of nodes from which the routes to be computed will start. For example, from the start location 204 of FIG. 2, the "OriginList" can include the first replenishment location 302 of FIG. 3, the first intermediate stop 312 of FIG. 3, or the combination thereof.

"TargetListSize" is defined as the number of target nodes in the graph. For example from FIG. 3, the target location 238 can include the first replenishment location 302, the second replenishment location 304 of FIG. 3, the third replenishment location 306 of FIG. 3, the second intermediate stop 314 of FIG. 3, and the destination 206 of FIG. 2. The "TargetListSize" can be 5.

"RoutePrecompute( )" is defined as a function that returns the target location 238 and set it to the "TargetNodeList." For example, "RoutePrecompute( )" can return the target location 238 that includes the first replenishment location 302, the second replenishment location 304, the third replenishment location 306, the second intermediate stop 314, and the destination 206.

"TargetNodeList" is defined as the list of target nodes. For example, the "TargetNodeList" can represent the target location 238.

The simplified graph generator module 510 can include a linking simplified graph generator submodule 804 and is coupled to the initializer simplified graph generator submodule 802. The linking simplified graph generator submodule 804 includes the following functions to create links for each node in the target location 238 as used in the pseudo code 3:

```
For each TargetNode in TargetNodeList
    Create Link with
        Link.originId = Node.id
        Link.nextId = TargetNode.id
        Link.cost = TargetNode.cost
```

```
Link.consumed = fullCharge – TargetNode.charge
Link.time = TargetNode.altTime
```

"Link" is defined as the path from one node to another. "Link" can have the same characteristic as "Links" as previously described.

For example, "Link.originId=Node.id" identifies the ID of the stopping point where the "Link" is starting from. More specifically, if "Node.id" is the ID for the start location 204, the "Link.originID" can be associated as the "Link" starting from the start location 204.

"Link.nextId=TargetNode.id" identifies the ID of the stopping point where the "Link" is ending at. More specifically, "TargetNode" can represent stopping point in the target location 238. For example, the "TargetNode" can represent the first replenishment location 302. The "Link.nextId" can be associated as the "Link" reaching the first replenishment location 302 from the start location 204.

"Link.cost=TargetNode.cost" calculates the estimation of the cost to travel to the next stopping point. More specifically, "TargetNode.cost" can represent the estimated sectional travel time 234 of FIG. 2, the estimated sectional financial cost 236 of FIG. 2, or the combination thereof to reach the stopping point representing the target location 238. For example, the "Link.cost" can represent the estimated sectional travel time 234 for reaching the first replenishment location 302.

"Link.consumed=fullCharge–TargetNode.charge" calculates the estimation of the amount of resource, fuel, or the combination thereof that a vehicle can require for traveling the path reach the next stopping point. More specifically, "Link.consumed" can represent the estimated consumption level 226 of FIG. 2. "fullCharge" can represent the full battery capacity. The "TargetNode.charge" can represent the estimated arrival level 218 for reaching the next stopping point. For example, the estimated consumption level 226 for traveling the travel section 212 of FIG. 2 from the start location 204 to the first replenishment location 302 can be calculated by subtracting the estimated arrival level 218 from the full battery capacity.

"Link.time=TargetNode.altTime" calculates the estimation of the amount of time required to travel along the alternate transportation route 228 of FIG. 2 for reaching the next stopping point. More specifically, "TargetNode.altTime" can represent the estimated alternate transportation time 230 of FIG. 2 to reach the stopping point representing the target location 238. For example, the "Link.time" can represent the estimated alternate transportation time 230 for reaching the destination 206 of FIG. 2 from the second intermediate stop 314 of FIG. 3.

The simplified graph generator module 510 can include a transfer simplified graph generator submodule 806 and is coupled to the linking simplified graph generator submodule 804. The transfer simplified graph generator submodule 806 includes the following function to create a simplified graph as used in the pseudo code 3:

```
Add Link to NewGraph as follows:
    Copy node with id Link.originId from Graph to NewGraph if not
        already copied
    Copy node with id Link.nextId from Graph to NewGraph if not already
        copied
    Create a link in NewGraph with the same field values as Link
```

"NewGraph" is defined as the simplified graph to which the pre-computed routes are added as links Continuing from the previous example, "Copy node with id Link.originId from Graph to NewGraph if not already copied" can assign the ID for the start location 204 from the "Graph" to the "NewGraph." "Copy node with id Link.nextId from Graph to NewGraph if not already copied" can assign the ID for the first replenishment location 302 from the "Graph" to the "NewGraph."

"Create a link in NewGraph with the same field values as Link" can assign from the "Graph" to the "NewGraph" a link having the estimated sectional travel time 234, the estimated sectional financial cost 236, or the combination thereof traveling from the start location 204 to the first replenishment location 302. "Create a link in NewGraph with the same field values as Link" can also assign from the "Graph" to the "NewGraph" a link having the estimated consumption level 226 and the estimated alternate transportation time 230 traveling from the second intermediate stop 314 to the destination 206.

The physical transformation from creating the simplified graph results in movement in the physical world, such as people using the first device 102 of FIG. 1, the vehicle, or a combination thereof, based on the operation of the navigation system 100. As the movement in the physical world occurs, the movement itself creates additional information that is converted back to generate the travel route 214 for the continued operation of the navigation system 100 and to continue the movement in the physical world.

It has been discovered that the present invention provides the navigation system 100 to generate the travel route 214 based on the simplified graph more efficiently by eliminating the number of nodes required to be considered for generating the travel route 214. Nodes that failed to make it on the simplified graph can be ignored to alleviate computation burden for generating the travel route 214. The simplified graph can aid by permitting the navigation system 100 to generate the travel route 214 more rapidly and accurately for the safer operation of vehicle to reach the destination 206.

Figure 9:
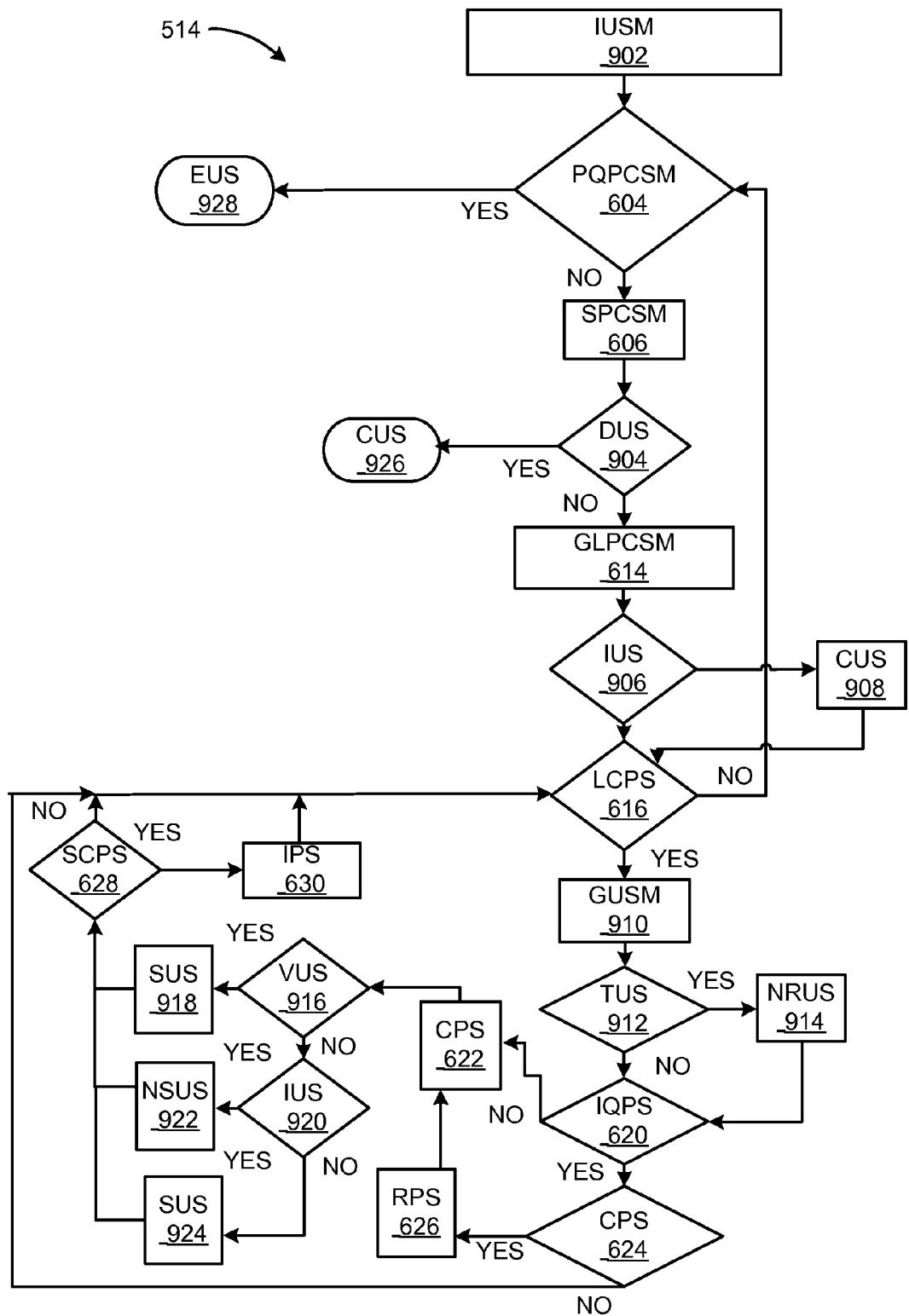
FIG. 9 is a flow of the uni-directional module.

Referring now to FIG. 9, therein is shown a flow of the uni-directional module 514. The uni-directional module 514 generates a path from the "Origin" to the target destination. More specifically, the uni-directional module 514 can generate the path between multiple locations representing the replenishment location 210 of FIG. 2 based on the links calculated in the simplified graph.

For example, the uni-directional module 514 can generate the travel route 214 of FIG. 2 through the replenishment location 210 of FIG. 2, the intermediate stop 208 of FIG. 2, or the combination thereof to the destination 206 of FIG. 2. The uni-directional module 514 can be shown in pseudo code format as in the following pseudo code 4:

```
// initialize data structures
PriorityQueue.clear( )
NodeSet.clear( )
Origin = NodeSet.getNode(Graph, OriginId, initialCharge)
Origin.cost = 0
Origin.state = 1
Origin.previous = NULL // signifies beginning of route, i.e., there is no
previous node on the route
PriorityQueue.insert(Origin) // sets Origin.inQueue = true
// search nodes in order of cost
While ( PriorityQueue.isEmpty( ) is false)
    Node = PriorityQueue.top( )
    Node.settled = true // getNode sets settled to false when node is
    first encountered
    If ( Node.id equals DestinationId )
        Reconstruct Route by following linked list starting at
        Node.previous
        Return route
    Links = Graph.getLinks(Node.id)
```

-continued

```
If ( Node.replenishment is true and Node.state is less than 3)
    // add a waiting link for recharging
    Link.nextId = Node.id
    Link.cost = Graph.rechargeCost(Node.id, fullCharge,
    Node.charge) // waiting time or monetary cost
    Link.consumed = Node.charge – fullCharge // a negative value
    means charge is increased
    Links.add(Link) // adds a link to the array of links
For ( i = 0; i < Links.count( ); i = i+1 )
    id = Links[i].nextId
    NextNode = NodeSet.getNode(Graph, id, Node.charge –
    Links[i].consumed)
    If ( Node.replenishment is true and Node.id equals id )
        NextNode. replenishment = false // second node at
        replenishment location
    If ( NextNode.inQueue is true )
        If ( NextNode.cost > Links[i].cost + Node.cost )
            PriorityQueue.remove(NextNode)
            NextNode.previous = pointer to Node // links
            nodes on route back to origin
            NextNode.cost = Links[i].cost + Node.cost
            If ( Node.replenishment is true and Node.id
            equals id )
                NextNode.state = 2
            Else if (NextNode.replenishment equals false
            and Node.state equals 2)
                NextNode.state = 3
            Else
                NextNode.state = Node.state
            If (NextNode.charge > minimumSafeCharge)
                PriorityQueue.insert(NextNode) // sets
                NextNode.inQueue = true
    Else if ( NextNode.settled is false )
        NextNode.previous = pointer to Node // links
        nodes on route back to origin
        NextNode.cost = Links[i].cost + Node.cost
        If ( Node.replenishment is true and Node.id
        equals id )
            NextNode.state = 2
        Else if (NextNode.replenishment equals false and
        Node.state equals 2)
            NextNode.state = 3
        Else
            NextNode.state = Node.state
        If (NextNode.charge > minimumSafeCharge)
            PriorityQueue.insert(NextNode)
// no feasible route exists to destination with the given amount of charge
and charge capacity
Return error
```

The following table defines the mapping between the pseudo code and the specification elements. The table will be denoted as Table 4:

| Pseudo Code Parameters | Specification Elements |
| --- | --- |
| state | No equivalence |

The uni-directional module 514 can include the priority queue pre-computation submodule 604, the settled pre-computation submodule 606, and the get-link pre-computation submodule 614 with each having the same function, establishing the same condition, or the combination thereof as described in FIG. 6. The uni-directional module 514 can include the link-counter pre-computation submodule 616, the in-queue pre-computation submodule 620, the calculator pre-computation submodule 622, the cost pre-computation submodule 624, and the remove pre-computation submodule 626 with each having the same function, establishing the same condition, or the combination thereof as described in FIG. 6. The uni-directional module 514 can include the safe charge pre-computation submodule 628, and the fifteenth pre-computation submodule with each having the same function, establishing the same condition, or the combination thereof as described in FIG. 6.

The uni-directional module 514 can include an initializer uni-directional submodule 902. The initializer uni-directional submodule 902 includes the following functions to initialize the data structures used in the pseudo code 4:

```
PriorityQueue.clear( )
NodeSet.clear( )
Origin = NodeSet.getNode(Graph,OriginId, initialCharge)
Origin.cost = 0
Origin.state = 1
Origin.previous = NULL
PriorityQueue.insert(Origin)
```

"initialCharge" is defined as a field for the "Origin" for amount of resource, fuel, or the combination thereof available at the start location 204. "state" is defined as a field of a node representing the status of whether stopping point has been added to the target location 238 of FIG. 2. For example, the "state" equals to "1" if the path computed to the node does not yet include pre-computed replenishment links. The "state" equals to "2" if the most recent link, excluding any waiting links, are pre-computed replenishment links. In other scenarios, the "state" equals to "3," and replenishment is not considered. "Origin.state=1" sets the "state" for the "Origin" to "1," because the pre-computation of the links to the start location 204 is not required.

The uni-directional module 514 can include a destination uni-directional submodule 904 and is coupled to the initializer uni-directional submodule 902. The destination uni-directional submodule 904 identifies the condition of whether the node is a target destination has been met or not. For example, the destination uni-directional submodule 904 can identify the intermediate stop 208, the destination 206, or the combination thereof from the target location 238. For a further example, the destination uni-directional submodule 904 includes the following function to identify the condition in pseudo code 4:

If (Node.id equals DestinationId)

"DestinationId" is defined as the ID for the node representing the destination 206. If the "Node.id" equals the "DestinationId," the destination uni-directional submodule 904 can identify the node as the destination 206. If the "Node.id" can equal the "DestinationId," the destination uni-directional submodule 904 can invoke an error uni-directional submodule 928. In contrast, if the Node.id" does not equal the "DestinationId," the destination uni-directional submodule 904 can invoke the get-link pre-computation submodule 614.

The uni-directional module 514 can include an identifier uni-directional submodule 906 and is coupled to the get-link pre-computation submodule 614. The identifier uni-directional submodule 906 identifies the condition of whether the node is the replenishment location 210 has been met or not. For example, the identifier uni-directional submodule 906 can identify the replenishment location 210 from the target location 238.

Additionally, the identifier uni-directional submodule 906 identifies the condition of whether the value of the "state" is less than 3. For a further example, the identifier uni-directional submodule 906 includes the following function to identify the conditions from pseudo code 4:

If (Node.replenishment is true and Node.state is less than 3)

"replenishment" is defined as a field of the node to represent whether the node is the replenishment location 210 or not. If "replenishment" is set to "true," the node is a stopping point representing the replenishment location 210. For example, a node representing the first replenishment location 302 of FIG. 3 can have the "replenishment" set to "true."

If the node is one of the stopping points representing the target location 238, the value of the "state" for the node can be less than "3." For example, the first replenishment location 302 can be one of the stopping points representing the target location 238. The uni-directional module 514 identifying the first replenishment location 302 can satisfy the condition for If (Node.replenishment is true and Node.state is less than 3).

The uni-directional module 514 can include a cost uni-directional submodule 908 and is coupled to the identifier uni-directional submodule 906. The cost uni-directional submodule 908 calculates the time cost, the monetary cost, or the combination thereof associated with replenishing the vehicle at the replenishment location 210.

For further example, the cost uni-directional submodule 908 can calculate the time cost, the monetary cost, or the combination thereof for replenishing the resource, fuel, or the combination thereof for the vehicle. For another example, the cost uni-directional submodule 908 includes the following functions to calculate the time cost, the monetary cost, or the combination thereof as from pseudo code 3:

```
Link.nextId = Node.id
Link.cost = Graph.rechargeCost(Node.id, fullCharge, Node.charge)
Link.consumed = Node.charge − fullCharge
Links.add(Link)
```

"Link" here is defined as a data structure representing the waiting link for replenishing the vehicle for each replenishment opportunity. For example, that stopping point or "Node.id" can represent the first replenishment location 302. For a further example, "Link.nextId" can represent the waiting link at the first replenishment location 302.

"Link.cost" is defined as the time cost, the monetary cost, or the combination thereof associated with replenishing the vehicle at the replenishment location 210. The cost uni-directional submodule 908 can calculate the "Link.cost" by executing the "Graph.rechargeCost( )" The "Graph.rechargeCost( )" can extract the "cost" information related to the replenishing of the vehicle from the simplified graph.

"Link.consumed" is defined as the amount of replenishment required to replenish the vehicle to full capacity. For example, the amount of replenishment can be equivalent to the estimated consumption level 226 of FIG. 2.

"Links.add(Link)" adds the link to the array of links. By adding "Link" to "Links," the cost uni-directional submodule 908 can calculate the "cost" associate for traveling that particular "Links."

The uni-directional module 514 can include a get-node uni-directional submodule 910 and is coupled to the link-counter pre-computation submodule 616. The get-node uni-directional submodule 910 identifies the candidate for the next stopping point based on the estimated arrival level 218 of FIG. 2 for the vehicle arriving at the next stopping point. For example, the get-node uni-directional submodule 910 can include the same functions as described in the get-node pre-computation submodule 618 of FIG. 6 with one additional input for "NodeSet.getNode( )", as from pseudo code 4:

NextNode=NodeSet.getNode(Graph, id, Node.charge–Links[i].consumed)

The function "NodeSet.getNode(Graph, id, Node.charge–Links[i].consumed)" can represent the same function as "NodeSet.getNode( )" described in FIG. 6 with one additional input "Node.charge–Links[i].consumed." "Node.charge" is as described in FIG. 6. "Links[i].consumed" is as described in FIG. 6. The get-node uni-directional submodule 910 can execute "NodeSet.getNode(Graph, id, Node.charge–Links[i].consumed)" to return the next stopping point having the "NextNode.charge" as described in FIG. 6.

For a more specific example, the "NextNode" will have the "NextNode.charge" or the estimated arrival level 218 as described in FIG. 6. As illustrated in FIG. 6, "NodeSet.getNode(Graph, id, Node.charge–Links[i].consumed)" can return the first replenishment location 302 with the vehicle having the "NextNode.charge" or the estimated arrival level 218 of 25%.

The uni-directional module 514 can include a true uni-directional submodule 912 and is coupled to the get-node uni-directional submodule 910. The true uni-directional submodule 912 identifies whether the condition that "NextNode" is not the same as the "Node." For example, the true uni-directional submodule 912 includes the following function to identify the condition, as described from pseudo code 4:

If (Node.replenishment is true and Node.id equals id)

For a further example, "If (Node.replenishment is true and Node.id equals id)" can be the same function as "If (Node.replenishment is true)" of the target determinator pre-computation submodule 608 of FIG. 6 with one additional input. "Node.id equals id" verifies whether the "NextNode.id" is the same as the "Node.id." For example, the "Node.id" can represent the first replenishment location 302. If the "NextNode.id" also represents the first replenishment location 302, the true uni-directional submodule 912 can invoke a non-replenish uni-directional submodule 914.

The uni-directional module 514 can include the non-replenish uni-directional submodule 914 and is coupled to the true uni-directional submodule 912. The non-replenish uni-directional submodule 914 sets the "replenishment" to "false" for the "NextNode." For example the non-replenish uni-directional submodule 914 can set the "replenishment" with the following function from pseudo code 4:

NextNode.replenishment=false

By setting the "replenishment" as "false," the uni-directional module 514 cannot include that the "NextNode.id" is the same as the "Node.id." More specifically, the uni-directional module 514 can avoid duplicate generation of the travel route 214 to the same location for the replenishment location 210.

The uni-directional module 514 can include a validifier uni-directional submodule 916 and is coupled to the calculator pre-computation submodule 622. The validifier uni-directional submodule 916 can identify the same condition as described in the true uni-directional submodule 912.

The uni-directional module 514 can include a state uni-directional submodule 918 and is coupled to the validifier uni-directional submodule 916. The state uni-directional submodule 918 can set the value of the "state" for the "NextNode" with the following function from pseudo code 4:

NextNode.state=2

For example, by meeting the condition of "Node.id equals id" for the validifier uni-directional submodule 916, the stopping point can be one of the most recent links pre-computed by the pre-computation module 506 of FIG. 5. Subsequently, the state uni-directional submodule 918 can set the value of the "state" for the "NextNode" to "2."

The uni-directional module 514 can include an invalidifier uni-directional submodule 920 and is coupled to the validifier uni-directional submodule 916. The invalidifier uni-directional submodule 920 identifies whether the condition that although the path to the "Node" is a most recent link, "NextNode" is not a stopping representing the replenishment location 210 has been met or not. For example, the invalidifier uni-directional submodule 920 includes the following function to identify the condition from pseudo code 4:

If (Node.replenishment is false and Node.state equals 2)

For pseudo code 4, the invalidifier uni-directional submodule 920 can establish a condition that allows the uni-directional module 514 to avoid calculating the waiting links for replenishing the vehicle if the stopping point is not one of the replenishment location 210. For example, if the condition is not met, the invalidifier uni-directional submodule 920 can invoke a non-state uni-directional submodule 922.

The uni-directional module 514 can include the non-state uni-directional submodule 922 and is coupled to the invalidifier uni-directional submodule 920. The non-state uni-directional submodule 922 can set the value of the "state" for the "NextNode" with the following function from pseudo code 4:

NextNode.state=3

As stated previously, the uni-directional module 514 can avoid invoking the cost uni-directional submodule 908 if the value for the "state" is set to "3." More specifically, the waiting link for the "NextNode" will not be calculated.

The uni-directional module 514 can include a status uni-directional submodule 924 and is coupled to the invalidifier uni-directional submodule 920. The status uni-directional submodule 924 can set the value of the "state" for the "NextNode" with the following function from pseudo code 4:

NextNode.state=Node.state

The status uni-directional submodule 924 sets the value of the "state" for the "NextNode" as the same as the stopping previous to the "NextNode." For example, the value of the "state" for the "NextNode" can be equal to the "Node."

The uni-directional module 514 can include a constructor uni-directional submodule 926 and is coupled to the destination uni-directional submodule 904. The constructor uni-directional submodule 926 generates the route to each of the stopping points selected from the target location 238. For example, the constructor uni-directional submodule 926 can generate the travel route 214 to the replenishment location 210, to the intermediate stop 208, the destination 206, or the combination thereof. For a further example, the constructor uni-directional submodule 926 includes the following function to generate the travel route 214 from pseudo code 4:

Recontruct Route by following linked list starting at Node.previous
Return route For example, the constructor uni-directional submodule 926 can generate the travel route 214 from the start location 204 through the replenishment location 210, the intermediate stop 208, or the combination thereof to the destination 206. The constructor uni-directional submodule 926 can send the travel route 214 to the display module 520 of FIG. 5.

The uni-directional module 514 can include the error uni-directional submodule 928 and is coupled to the priority queue pre-computation submodule 604. The error uni-directional submodule 928 can return "error" if the uni-directional module 514 fails to generate the travel route 214.

The physical transformation from identifying the replenishment location 210, the intermediate stop 208, the destination 206, or the combination thereof from the target location 238 results in movement in the physical world, such as people using the first device 102 of FIG. 1, the vehicle, or a combination thereof, based on the operation of the navigation system 100. As the movement in the physical world occurs, the movement itself creates additional information that is converted back to generate the travel route 214 for the continued operation of the navigation system 100 and to continue the movement in the physical world.

It has been discovered that the present invention provides the navigation system 100 to generate the travel route 214 based on incorporating the links pre-computed by the pre-computation module 506, the pruning module 508, or the combination thereof. The identification of the "state" of each node aids the navigation system 100 to identify the replenishment location 210, the intermediate stop 208, the destination 206, or the combination thereof more accurately and rapidly for generating the travel route 214. The quicker and more accurate generation of the travel route 214 can aid the user of a safer operation of the vehicle to reach the destination 206.

Figure 10:
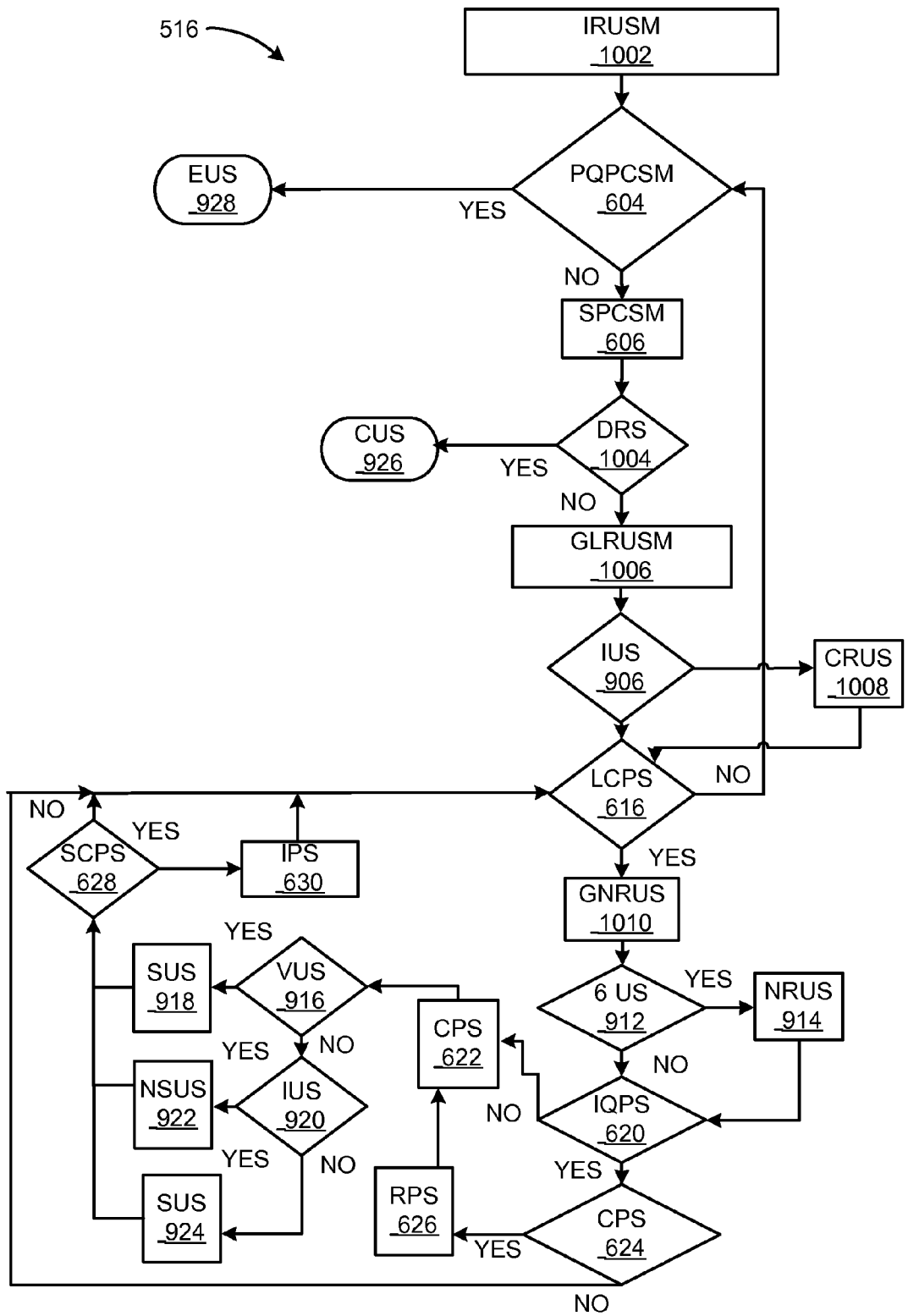
FIG. 10 is a flow of the reverse uni-directional module.

Referring now to FIG. 10, therein is shown a flow of the reverse uni-directional module 516. The reverse uni-directional module 516 generates a path from the target destination to the "Origin."

For example, the reverse uni-directional module 516 can generate the reverse travel route 240 from the destination 206 of FIG. 2 to the start location 204 of FIG. 2 based on selecting the replenishment location 210 of FIG. 2, the intermediate stop 208 of FIG. 2, or the combination thereof from the target location 238 of FIG. 2. The reverse uni-directional module 516 can be shown in pseudo code format as in the pseudo code 4 with the following modification. The "Graph" in the pseudo code 4 can be replaced with "ReverseGraph."

The "ReverseGraph" is defined as the data structure representing a graph like "Graph" but in which every link from a node A to a node B has been replaced by a link from node B to node A. Such a link still represents travel from node A to node B, but "ReverseGraph.getLinks( )" returns the link when given node B instead when given node A.

The reverse uni-directional module 516 can include the priority queue pre-computation submodule 604, and the settled pre-computation submodule 606 with each having the same function, establishing the same condition, or the combination thereof as described in FIG. 6. The reverse uni-directional module 516 can include the link-counter pre-computation submodule 616, the in-queue pre-computation submodule 620, the calculator pre-computation submodule 622, the cost pre-computation submodule 624, and the remove pre-computation submodule 626 with each having the same function, establishing the same condition, or the combination thereof as described in FIG. 6. The reverse uni-directional module 516 can include the safe charge pre-computation submodule 628, and the fifteenth pre-computation submodule with each having the same function, establishing the same condition, or the combination thereof as described in FIG. 6.

The reverse uni-directional module 516 can include the destination uni-directional submodule 904, the identifier uni-directional submodule 906, the true uni-directional submodule 912, and the non-replenish uni-directional submodule 914 with each having the same function, establishing the same condition, or the combination thereof as described in FIG. 9. The reverse uni-directional module 516 can include the validifier uni-directional submodule 916, the state uni-directional submodule 918, the invalidifier uni-directional submodule 920, and the non-state uni-directional submodule 922 with each having the same function, establishing the same condition, or the combination thereof as described in FIG. 9. The reverse uni-directional module 516 can include the status uni-directional submodule 924, the constructor uni-directional submodule 926, and the error uni-directional submodule 928 with each having the same function, establishing the same condition, or the combination thereof as described in FIG. 9.

The reverse uni-directional module 516 can include an initializer reverse uni-directional submodule 1002 with having the same function, establishing the same condition, or the combination thereof as described in the initializer uni-directional submodule 902 of FIG. 9 with the "Graph" replaced to "ReverseGraph," the "Origin" replaced to the destination 206, and the "OriginId" replaced to "DestinationId." The reverse uni-directional module 516 can include a destination reverse uni-directional submodule 1004 with having the same function, establishing the same condition, or the combination thereof as described in the destination uni-directional submodule 904 of FIG. 9 with the "OriginId" replaced to "DestinationId." The reverse uni-directional module 516 can include a get-link reverse uni-directional submodule 1006 with having the same function, establishing the same condition, or the combination thereof as described in the get-link pre-computation submodule 614 of FIG. 6 with the "Graph" replaced to "ReverseGraph."

The reverse uni-directional module 516 can include a cost reverse uni-directional submodule 1008 with having the same function, establishing the same condition, or the combination thereof as described in the cost uni-directional submodule 908 of FIG. 9 with the "Graph" replaced to "ReverseGraph." The reverse uni-directional module 516 can include a get-node reverse uni-directional submodule 1010 with having the same function, establishing the same condition, or the combination thereof as described in the get-node uni-directional submodule 910 of FIG. 9 with the "Graph" replaced to "ReverseGraph."

It has been discovered that the present invention provides the navigation system 100 to generate the reverse travel route 240 based on incorporating the links pre-computed by the pre-computation module 506, the pruning module 508, or the combination thereof from the destination 206 to the start location 204. By identifying each stopping point from the reverse direction, the navigation system 100 can identify whether the travel route 214 generated from the start location 204 to the destination 206 is the most optimal path the user can travel to reach the destination. By identifying the most optimal route can aid the user a safer operation of the vehicle to reach the destination 206 without running out of resource, fuel, or the combination thereof.

Figure 11:
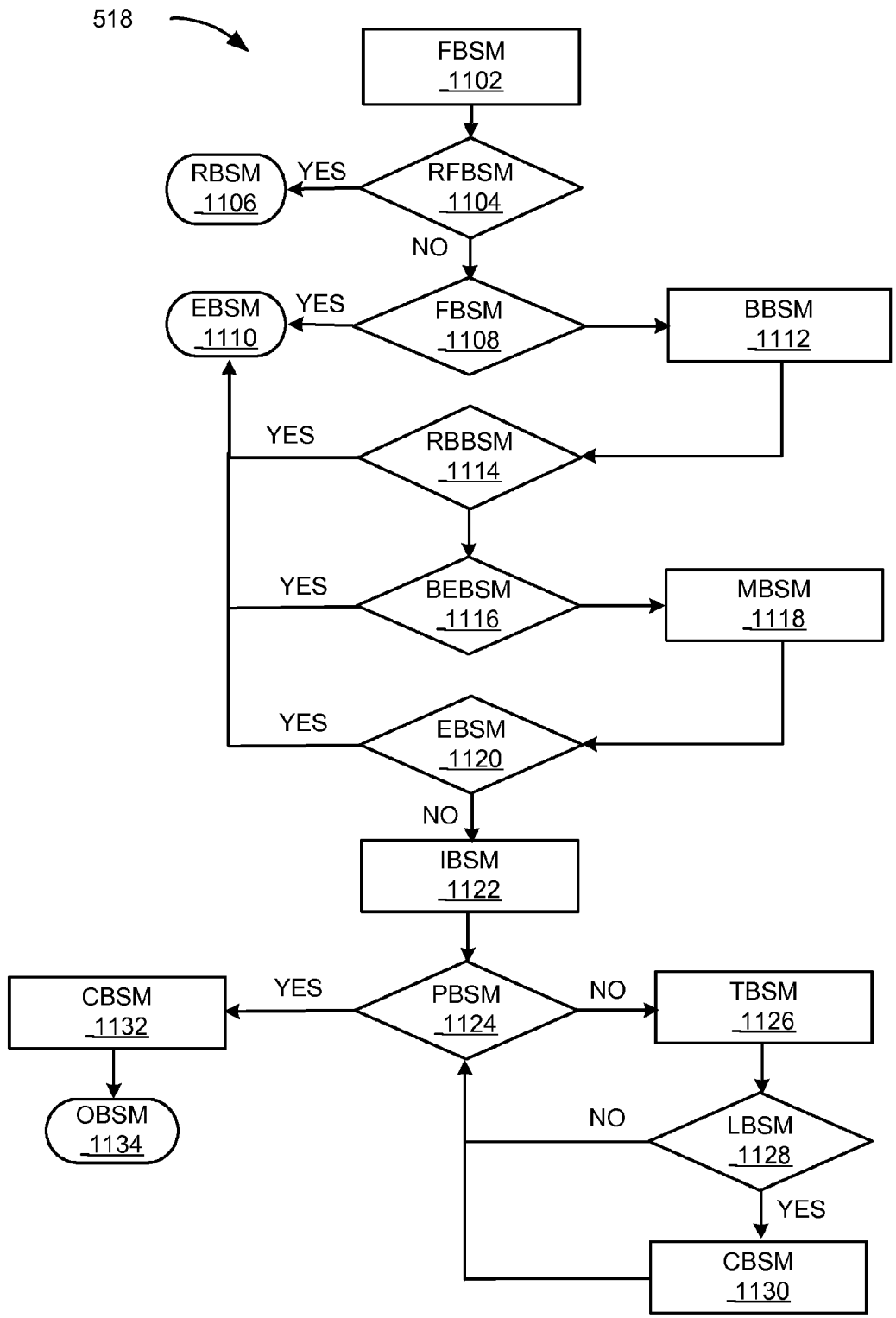
FIG. 11 is a flow of the bi-directional module.

Referring now to FIG. 11, therein is shown a flow of the bidirectional module 518. The bidirectional module 518 searches for the travel route 214 of FIG. 2 when at most one stopping point for the replenishment location 210 of FIG. 2 is needed. For example, the bidirectional module 518 can generate the reverse travel route 240 of FIG. 2 from the destination 206 of FIG. 2 through the replenishment location 210, the intermediate stop 208 of FIG. 2, or the combination thereof for reaching the start location 204 of FIG. 2. The bidirectional module 518 can be described by a pseudo code 5:

```
ResultForward = Route1Replenishment(Graph, OriginId, DestinationId,
    initialCharge, ReplenishmentIds)
If (ResultForward contains a route)
    // No replenishment is needed using the route returned.
```

-continued

```
    Return the route
If ResultForward contains no list of nodes
    // there is no route to reach destination with only one replenishment
    Return error
// Otherwise search backward from destination
ResultBackward = Route1Replenishment(ReverseGraph, DestinationId,
OriginId, fullCharge, ReplenishmentIds)
If (ResultBackward contains a route)
    // something went wrong; should not happen
    Return error
If ResultBackward contains no nodes
    // there is no route that to reach destination with only one
    replenishment
    Return error
// Find all replenishment nodes in ResultForward that match replenishment
// nodes in ResultBackward
Matches = all pairs NodeForward from ResultForward and NodeBackward
from ResultBackward for which
    NodeForward.id = NodeBackward.id
If Matches is empty
    // there is no route to reach destination with only one replenishment
    Return error
MinCost = ∞
 For each pair, NodeForward and NodeBackward, in Matches
    replenishmentTime = value computed from initialCharge,
    NodeForward.charge, and (maybe) NodeBackward.charge
    If (NodeForward.cost + NodeBackward.cost + replenishmentTime <
    MinCost)
        MinCost = NodeForward.cost + NodeBackward.cost +
        replenishmentTime
            MinNodeForward = NodeForward
            MinNodeBackward = NodeBackward
    Construct route by following linked lists starting at
MinNodeForward.previous and MinNodeBackward.previous
    Return route
```

Here, "Graph" is a data structure representing the graph. "ReverseGraph" is the data structure that is a graph like "Graph" but in which every link from a node A to a node B has been replaced by a link from node B to node A. Such a link still represents travel from node A to node B, but "ReverseGraph.getLinks( )" returns the link when given node B instead when given node A.

"OriginId" and "DestinationId" are inputs and are the identifications of nodes in the graph which represent the origin and destination. "ReplenishmentIds" is an input which is an array containing the identifications of nodes representing replenishment location. A "fullCharge" is the amount of a full charge for the vehicle operating with or in conjunction with the navigation system 100.

The pseudo code 5 is depicted in the flow chart in FIG. 11. The bidirectional module 518 includes a forward bidirectional submodule 1102 and performs a forward search by executing the uni-directional module 514 of FIG. 5 by invoking "Route1Replenishment" and shown in the pseudo code 5:

```
ResultForward = Route1Replenishment(Graph, OriginId, DestinationId,
initialCharge, ReplenishmentIds)
```

The bidirectional module 518 includes a result forward bidirectional submodule 1104 and tests of the forward route from the start location 204 to the destination 206 includes one of stopping point for the replenishment location 210 of FIG. 2 and shown in the pseudo code 5:
    If (ResultForward contains a route)

The bidirectional module 518 includes a return bidirectional submodule 1106 and executes if the test from the result forward bidirectional submodule 1104 results in a true condition, then no replenishment is needed and the route generated from the uni-directional module 514 is returned, as described in the pseudo code 5:

```
// No replenishment is needed using the route returned.
    Return the route
```

The bidirectional module 518 includes a forward-empty bidirectional submodule 1108 and executes if the test from the result forward bidirectional submodule 1104 results in a false condition. The forward-empty bidirectional submodule 1108 tests if a route exists with only one of the stopping point representing the replenishment location 210 to the destination 206 and shown in the pseudo code 5:
    If ResultForward contains no list of nodes The bidirectional module 518 includes an error bidirectional submodule 1110. The error bidirectional submodule 1110 generates an error if the forward-empty bidirectional submodule 1108 results in a condition where no route exists or in a true condition that the route does not exist, as shown in the pseudo code 5:

```
// there is no route to reach destination with only one replenishment
    Return error
```

The bidirectional module 518 includes a backward bidirectional submodule 1112. The backward bidirectional submodule 1112 searches for a route backwards from the destination 206 to the start location 204. The backward bidirectional submodule 1112 performs a backward search by executing the reverse uni-directional module 516 of FIG. 10 by invoking "Route1Replenishment" and shown in the pseudo code 5:

```
// Otherwise search backward from destination
ResultBackward = Route1Replenishment(ReverseGraph, DestinationId,
OriginId, fullCharge, ReplenishmentIds)
```

The bidirectional module 518 includes a result backward bidirectional submodule 1114. The result backward bidirectional submodule 1114 tests if a route from the backward bidirectional submodule 1112 with one of the stopping point representing the replenishment location 210, as shown in the pseudo code 5:
    If (ResultBackward contains a route)
    If the result backward bidirectional submodule 1114 results in a true condition, this condition should not occur and the bidirectional module 518 returns an error with the error bidirectional submodule 1110, as shown in the pseudo code 5:

```
// something went wrong; should not happen
    Return error
```

The bidirectional module 518 includes a backward-empty bidirectional submodule 1116. The result backward bidirectional submodule 1114 tests if a route exists from the backward bidirectional submodule 1112 with one of the stopping point representing the replenishment location 210. The result backward bidirectional submodule 1114 operates for the non-true condition from the result backward bidirectional submodule 1114 and shown in the pseudo code 5:

If ResultBackward contains no nodes

The bidirectional module 518 includes a matcher bidirectional submodule 1118. The matcher bidirectional submodule 1118 executes if the tests leading to the error bidirectional submodule 1110 do not occur. The matcher bidirectional submodule 1118 finds all locations representing the replenishment location 210 that matches between the route generated from the forward search in "ResultForward" and the route generated from the backwards search in "ResultBackward", as shown in the pseudo code 5:

```
// Find all replenishment nodes in ResultForward that match replenishment
// nodes in ResultBackward
Matches = all pairs NodeForward from ResultForward and NodeBackward
from ResultBackward for which
    NodeForward.id = NodeBackward.id
```

The bidirectional module 518 includes an empty bidirectional submodule 1120. The empty bidirectional submodule 1120 tests if the "Matches" generated from the matcher bidirectional submodule 1118 is empty or not, as shown in the pseudo code 5:

If Matches is empty

If the empty bidirectional submodule 1120 results in a true condition such that "Matches" is empty, then the bidirectional module 518 returns an error with the error bidirectional submodule 1110.

The bidirectional module 518 includes an infinite bidirectional submodule 1122. The infinite bidirectional submodule 1122 initializes a minimum cost, "MinCost" to a high water mark as infinity, as shown in the pseudo code 5:

MinCost=∞

The bidirectional module 518 includes a pair bidirectional submodule 1124, a time bidirectional submodule 1126, a lower bidirectional submodule 1128, and a checker bidirectional submodule 1130. The pair bidirectional submodule 1124 runs through all the nodes in "Matches", as shown in the pseudo code 5:

For each pair, NodeForward and NodeBackward, in Matches

The time bidirectional submodule 1126, the lower bidirectional submodule 1128, and the checker bidirectional submodule 1130 operates until the all the matches in "Matches" have been examined. The time bidirectional submodule 1126 calculates the time to replenish at a node found in "Matches" based on the initial charge, "initialCharge", the remaining charge from traversing on the forward route, "NodeForward.charge", and optionally with the remaining charge from traversing along the backwards route, "NodeBackward.charge", as shown in the pseudo code 5:

```
replenishmentTime = value computed from initialCharge,
NodeForward.charge, and (maybe) NodeBackward.charge
```

The lower bidirectional submodule 1128 tests to see if the current node in "Matches" along with the replenishment time is lower than a previously calculated or set minimum cost, "MinCost", as shown in the pseudo code 5:

If        (NodeForward.cost+NodeBackward.cost+replenishmentTime<MinCost)

If the lower bidirectional submodule 1128 results in the current node not being less than the previously calculated or set minimum cost, "MinCost", than the search continues through the "Matches" list and returns to the pair bidirectional submodule 1124.

The checker bidirectional submodule 1130 operates if the lower bidirectional submodule 1128 results in the current node being less than the previously calculated or set minimum cost, "MinCost". The checker bidirectional submodule 1130 sets the minimum cost, "MinCost" with the current cost calculated in the lower bidirectional submodule 1128, the minimum forward node "MinNodeForward", and a minimum backward node "MinNodeBackward", as shown in the pseudo code 5:

```
MinCost = NodeForward.cost + NodeBackward.cost + replenishmentTime
MinNodeForward = NodeForward
MinNodeBackward = NodeBackward
```

The bidirectional module 518 includes a constructor bidirectional submodule 1132. From the checker bidirectional submodule 1130, the search continues through the "Matches" list and returns to the pair bidirectional submodule 1124. When the search through the matches completes, the pair bidirectional submodule 1124 continues to the constructor bidirectional submodule 1132.

The constructor bidirectional submodule 1132 constructs the route with the minimum forward node "MinNodeForward", and a minimum backward node "MinNodeBackward" calculated in the checker bidirectional submodule 1130, as shown in the pseudo code 5:

```
Construct route by following linked lists starting at
MinNodeForward.previous and MinNodeBackward.previous
```

The bidirectional module 518 includes an output bidirectional submodule 1134. The output bidirectional submodule 1134 returns the route constructed from the constructor bidirectional submodule 1132 for the output for the bidirectional module 518.

The physical transformation from generating the travel route 214, the reverse travel route 240, or the combination thereof results in movement in the physical world, such as people using the first device 102 of FIG. 1, the vehicle, or a combination thereof, based on the operation of the navigation system 100. As the movement in the physical world occurs, the movement itself creates additional information that is converted back to generate the travel route 214, the reverse travel route 240, or the combination thereof for the continued operation of the navigation system 100 and to continue the movement in the physical world.

It has been discovered that the present invention provides the navigation system 100 to identify the replenishment location 210 accurately and generate the travel route 214 efficiently for safer operation of the vehicle, the navigation system 100, and other user interface system within the vehicle. The accuracy is provided by identifying the replenishment location 210 by searching not only from the start location 204 to the destination 206, but also from the destination 206 to the start location 204. The bi-directional approach can reduce error for identifying the replenishment location 210 that the vehicle can safely reach. Subsequently, the navigation system 100 can generate the travel route 214 that can aid the vehicle to safely reach the destination 206 via the replenishment location 210 most suitable for the vehicle for replenishment.

Figure 12:
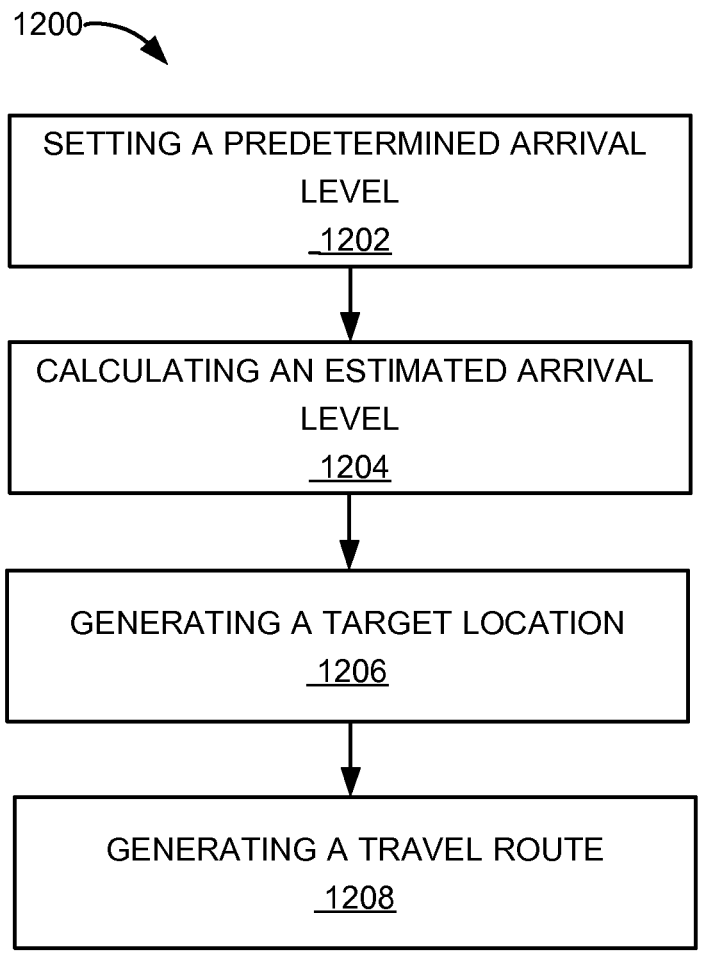
FIG. 12 is a flow chart of a method of operation of the navigation system with constrained resource route planning optimizer in a further embodiment of the present invention.

Referring now to FIG. 12, therein is shown a flow chart of a method 1200 of operation of the navigation system 100 with constrained resource route planning optimizer in a further embodiment of the present invention. The method 1200 includes setting a predetermined arrival level for arriving at a replenishment location in a block 1202; calculating an estimated arrival level for arriving at a replenishment location in a block 1204; generating a target location based on the estimated arrival level meeting or exceeding the predetermined arrival level in a block 1206; and generating a travel route to a destination based on selecting the replenishment location from the target location for displaying on a device in a block 1208.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   setting a predetermined arrival level for arriving at a replenishment location;
   calculating an estimated arrival level for arriving at the replenishment location;
   calculating an estimated sectional travel time for traversing one or more travel sections;
   comparing the estimated sectional travel time for traversing each of the travel sections;
   generating a target location based on the estimated arrival level meeting or exceeding the predetermined arrival level; and
   generating a travel route to a destination with a control unit based on selecting the replenishment location from the target location with the shortest of the estimated sectional travel time for traversing each of the travel sections for displaying on a device.

2. The method as claimed in claim 1 further comprising:
   calculating a predetermined distance for reaching the replenishment location;
   calculating a section distance for reaching the replenishment location; and
   wherein generating the target location includes selecting the replenishment location based on the section distance meeting or exceeding the predetermined distance for at least reaching the replenishment location.

3. The method as claimed in claim 1 further comprising:
   calculating a current location estimated level at the replenishment location;
   calculating an estimated consumption level for traversing one or more of the travel sections; and
   wherein generating the target location includes selecting the replenishment location based on the current location estimated level meeting or exceeding the estimated consumption level.

4. The method as claimed in claim 1 further comprising:
   calculating an allotted alternate transportation travel time for traversing an alternate transportation route to reach the replenishment location;
   calculating an estimated alternate transportation time for traversing the alternate transportation route to reach the replenishment location; and
   wherein generating the target location includes selecting the replenishment location based on the allotted alternate transportation travel time meeting or exceeding the estimated alternate transportation time.

5. The method as claimed in claim 1 further comprising:
   calculating an estimated sectional financial cost for traversing one or more of the travel sections; and
   wherein generating the target location includes:
   comparing the estimated sectional financial cost for traversing each of the travel sections; and
   selecting the replenishment location with the lowest of the estimated sectional financial cost for traversing each of the travel sections.

6. The method as claimed in claim 1 wherein generating the travel route includes generating a reverse travel route from the destination to a start location based on selecting the replenishment location from the target location.

7. The method as claimed in claim 1 wherein generating the travel route includes generating a reverse travel route from the destination to a start location based on selecting an intermediate stop from the target location.

8. The method as claimed in claim 1 wherein generating the travel route to the destination based on the target location includes:
   identifying the destination from the target location; and
   generating the travel route through the replenishment location, an intermediate stop, or a combination thereof to the destination.

9. The method as claimed in claim 1 wherein generating the travel route to the destination based on the target location includes:
   identifying the replenishment location from the target location; and
   generating the travel route to the replenishment location.

10. The method as claimed in claim 1 wherein generating the travel route to the destination based on the target location includes:
    identifying an intermediate stop from the target location; and
    generating the travel route to the intermediate stop.

11. A method of operation of a navigation system comprising:
    setting a predetermined arrival level for arriving at a replenishment location;
    calculating an estimated arrival level for arriving at the replenishment location;
    calculating an estimated sectional travel time for traversing one or more travel sections;
    comparing the estimated sectional travel time for traversing each of the travel sections;
    generating a target location based on the estimated arrival level meeting or exceeding the predetermined arrival level;
    identifying the replenishment location with the shortest of the estimated sectional travel time for traversing each of the travel sections from the target location; and generating a travel route through the replenishment location to a destination with a control unit for displaying on a device.

12. The method as claimed in claim 11 further comprising generating a reverse travel route from the destination through the replenishment location for reaching a start location.

13. The method as claimed in claim 11 wherein:
setting the predetermined arrival level includes setting the predetermined arrival level for arriving at the destination;
calculating the estimated arrival level includes calculating the estimated arrival level for arriving at the destination; and
generating the target location includes selecting the destination based on the estimated arrival level meeting or exceeding the predetermined arrival level.

14. The method as claimed in claim 11 wherein:
setting the predetermined arrival level includes setting the predetermined arrival level for arriving at an intermediate stop;
calculating the estimated arrival level includes calculating the estimated arrival level for arriving at the intermediate stop; and
generating the target location includes selecting the intermediate stop based on the estimated arrival level meeting or exceeding the predetermined arrival level.

15. The method as claimed in claim 11 further comprising:
calculating a current location estimated level at the destination;
calculating an estimated consumption level for traversing a travel section; and
wherein generating the target location includes selecting the destination based on the current location estimated level meeting or exceeding the estimated consumption level.

16. The method as claimed in claim 11 further comprising:
calculating a current location estimated level at an intermediate stop;
calculating an estimated consumption level for traversing a travel section; and
wherein generating the target location includes selecting the intermediate stop based on the current location estimated level meeting or exceeding the estimated consumption level.

17. The method as claimed in claim 11 further comprising:
calculating a predetermined distance for reaching the destination;
calculating a section distance for reaching the destination; and
wherein generating the target location includes selecting the destination based on the section distance meeting or exceeding the predetermined distance.

18. The method as claimed in claim 11 further comprising:
calculating a predetermined distance for reaching an intermediate stop;
calculating a section distance for reaching the intermediate stop; and
wherein generating the target location includes selecting the intermediate stop based on the section distance meeting or exceeding the predetermined distance.

19. The method as claimed in claim 11 further comprising:
calculating an allotted alternate transportation travel time for traversing an alternate transportation route to reach the destination;
calculating an estimated alternate transportation time for traversing the alternate transportation route to reach the destination; and
wherein generating the target location includes selecting the destination based on the allotted alternate transportation travel time meeting or exceeding the estimated alternate transportation time.

20. The method as claimed in claim 11 further comprising:
calculating an allotted alternate transportation travel time for traversing an alternate transportation route to reach an intermediate stop;
calculating an estimated alternate transportation time for traversing the alternate transportation route to reach the intermediate stop; and
wherein generating the target location includes selecting the intermediate stop based on the allotted alternate transportation travel time meeting or exceeding the estimated alternate transportation time.

21. The method as claimed in claim 11 further comprising:
calculating the estimated sectional travel time for traversing one or more of the travel sections; and
wherein generating the target location includes:
comparing the estimated sectional travel time for traversing each of the travel sections; and
selecting the destination with the shortest of the estimated sectional travel time for traversing each of the travel sections.

22. The method as claimed in claim 11 further comprising:
calculating the estimated sectional travel time for traversing one or more of the travel sections; and
wherein generating the target location includes:
comparing the estimated sectional travel time for traversing each of the travel sections; and
selecting an intermediate stop with the shortest of the estimated sectional travel time for traversing each of the travel sections.

23. The method as claimed in claim 11 further comprising:
calculating an estimated sectional financial cost for traversing one or more of the travel sections; and
wherein generating the target location includes:
comparing the estimated sectional financial cost for traversing each of the travel sections; and
selecting the destination with the lowest of the estimated sectional financial cost for traversing each of the travel sections.

24. The method as claimed in claim 13 further comprising:
calculating an estimated sectional financial cost for traversing one or more of the travel sections; and
wherein generating the target location includes:
comparing the estimated sectional financial cost for traversing each of the travel sections; and
selecting an intermediate stop with the lowest of the estimated sectional financial cost for traversing each of the travel sections.

25. A navigation system comprising:
a predetermined level module for setting a predetermined arrival level for arriving at a replenishment location;
a calculator pre-computation submodule, coupled to the predetermined level module, for:
calculating an estimated arrival level for arriving at the replenishment location, and
calculating an estimated sectional travel time for traversing one or more travel sections; and
a cost pre-computation submodule, coupled to the predetermined level module, for comparing the estimated sectional travel time for traversing each of the travel sections;
a return pre-computation submodule, coupled to the predetermined level module, for generating a target location based on the estimated arrival level meeting or exceeding the predetermined arrival level; and a route planning module, coupled to the return pre-computation submodule, for generating a travel route to a destination based on selecting the replenishment location from the target location with the shortest of the estimated sectional travel time for traversing each of the travel sections for displaying on a device.

26. The system as claimed in claim 25 further comprising:
a predetermined distance calculator module, coupled to the predetermined level module, for calculating a predetermined distance for reaching the replenishment location;
a distance pruning submodule, coupled to the predetermined distance calculator module, for calculating a section distance for reaching the replenishment location; and
an aggregator pre-computation submodule, coupled to the distance pruning submodule, for selecting the replenishment location based on the section distance meeting or exceeding the predetermined distance for at least reaching the replenishment location.

27. The system as claimed in claim 25 wherein:
the calculator pre-computation submodule is for calculating a current location estimated level at the replenishment location; and
further comprising:
a pre-computation module, coupled to the predetermined level module, for calculating an estimated consumption level for traversing a travel section; and
an aggregator pre-computation submodule, coupled to the predetermined level module, for selecting the replenishment location based on the current location estimated level meeting or exceeding the estimated consumption level.

28. The system as claimed in claim 25 further comprising:
a safe charge pre-computation submodule, coupled to the predetermined level module, for calculating an allotted alternate transportation travel time for traversing an alternate transportation route to reach the replenishment location;
a pre-computation module, coupled to the predetermined level module, for calculating an estimated alternate transportation time for traversing the alternate transportation route to reach the replenishment location; and
an aggregator pre-computation submodule, coupled to the predetermined level module, for selecting the replenishment location based on the allotted alternate transportation travel time meeting or exceeding the estimated alternate transportation time.

29. The system as claimed in claim 25 wherein:
the calculator pre-computation submodule is for calculating an estimated sectional financial cost for traversing one or more of the travel sections; and
further comprising:
a cost pre-computation submodule, coupled to the predetermined level module, for comparing the estimated sectional financial cost for traversing each of the travel sections; and
an aggregator pre-computation submodule, coupled to the predetermined level module, for selecting the replenishment location with the lowest of the estimated sectional financial cost for traversing each of the travel sections.

30. The system as claimed in claim 25 wherein the route planning module is for generating a reverse travel route from the destination to a start location based on selecting the replenishment location from the target location.

31. The system as claimed in claim 25 wherein the route planning module is for generating a reverse travel route from the destination to a start location based on selecting an intermediate stop from the target location.

32. The system as claimed in claim 25 wherein the route planning module includes:
a destination uni-directional submodule for identifying the destination from the target location; and
a constructor uni-directional submodule for generating the travel route through the replenishment location, an intermediate stop, or a combination thereof to the destination.

33. The system as claimed in claim 25 wherein the route planning module includes:
an identifier uni-directional submodule for identifying the replenishment location from the target location; and
a constructor uni-directional submodule for generating the travel route to the replenishment location.

34. The system as claimed in claim 25 wherein the route planning module includes:
a destination uni-directional submodule for identifying an intermediate stop from the target location; and
a constructor uni-directional submodule for generating the travel route to the intermediate stop.

35. The system as claimed in claim 25 further comprising:
a destination uni-directional submodule, coupled to the predetermined level module, for identifying the replenishment location from the target location; and
wherein:
the route planning module is for generating the travel route through the replenishment location to the destination for displaying on the device.

36. The system as claimed in claim 35 wherein the route planning module is for generating a reverse travel route from the destination through the replenishment location for reaching a start location.

37. The system as claimed in claim 35 wherein the return pre-computation submodule is for selecting the destination based on the estimated arrival level meeting or exceeding the predetermined arrival level.

38. The system as claimed in claim 35 wherein the return pre-computation submodule is for selecting an intermediate stop based on the estimated arrival level meeting or exceeding the predetermined arrival level.

39. The system as claimed in claim 35 further comprising:
a pre-computation module, coupled to the predetermined level module, for calculating a current location estimated level at the destination;
wherein:
the calculator pre-computation submodule is for calculating an estimated consumption level for traversing a travel section; and
the pre-computation module is for selecting the destination based on the current location estimated level meeting or exceeding the estimated consumption level.

40. The system as claimed in claim 35 further comprising:
a pre-computation module, coupled to the predetermined level module, for calculating a current location estimated level at an intermediate stop;
wherein:
the calculator pre-computation submodule is for calculating an estimated consumption level for traversing a travel section; and
the pre-computation module is for selecting the intermediate stop based on the current location estimated level meeting or exceeding the estimated consumption level.

41. The system as claimed in claim 35 further comprising:
a predetermined distance calculator module, coupled to the predetermined level module, for calculating a predetermined distance for reaching the destination;
a distance pruning submodule, coupled to the predetermined distance calculator module, for calculating a section distance for reaching the destination; and
an aggregator pre-computation submodule, coupled to the predetermined distance calculator module, for selecting the destination based on the section distance meeting or exceeding the predetermined distance.

42. The system as claimed in claim 35 further comprising:
a predetermined distance calculator module, coupled to the predetermined level module, for calculating a predetermined distance for reaching an intermediate stop;
a distance pruning submodule, coupled to the predetermined distance calculator module, for calculating a section distance for reaching the intermediate stop; and
an aggregator pre-computation submodule, coupled to the predetermined distance calculator module, for selecting the intermediate stop based on the section distance meeting or exceeding the predetermined distance.

43. The system as claimed in claim 35 further comprising:
a safe charge pre-computation submodule, coupled to the predetermined level module, for calculating an allotted alternate transportation travel time for traversing an alternate transportation route to reach the destination;
a pre-computation module, coupled to the predetermined level module, for calculating an estimated alternate transportation time for traversing the alternate transportation route to reach the destination; and
an aggregator pre-computation submodule, coupled to the predetermined level module, for selecting the destination based on the allotted alternate transportation travel time meeting or exceeding the estimated alternate transportation time.

44. The system as claimed in claim 35 further comprising:
a safe charge pre-computation submodule, coupled to the predetermined level module, for calculating an allotted alternate transportation travel time for traversing an alternate transportation route to reach an intermediate stop;
a pre-computation module, coupled to the predetermined level module, for calculating an estimated alternate transportation time for traversing the alternate transportation route to reach the intermediate stop; and
an aggregator pre-computation submodule, coupled to the predetermined level module, for selecting the intermediate stop based on the allotted alternate transportation travel time meeting or exceeding the estimated alternate transportation time.

45. The system as claimed in claim 35 wherein:
the calculator pre-computation submodule is for calculating the estimated sectional travel time for traversing one or more of the travel sections; and
further comprising:
a cost pre-computation submodule, coupled to the predetermined level module, for comparing the estimated sectional travel time for traversing each of the travel sections; and
an aggregator pre-computation submodule, coupled to the predetermined level module, for selecting the destination with the shortest of the estimated sectional travel time for traversing each of the travel sections.

46. The system as claimed in claim 35 wherein:
the calculator pre-computation submodule is for calculating the estimated sectional travel time for traversing one or more of the travel sections; and
further comprising:
a cost pre-computation submodule, coupled to the predetermined level module, for comparing the estimated sectional travel time for traversing each of the travel sections; and
an aggregator pre-computation submodule, coupled to the predetermined level module, for selecting an intermediate stop with the shortest of the estimated sectional travel time for traversing each of the travel sections.

47. The system as claimed in claim 35 wherein:
the calculator pre-computation submodule is for calculating an estimated sectional financial cost for traversing one or more of the travel sections; and
further comprising:
a cost pre-computation submodule, coupled to the predetermined level module, for comparing the estimated sectional financial cost for traversing each of the travel sections; and
an aggregator pre-computation submodule, coupled to the predetermined level module, for selecting the destination with the lowest of the estimated sectional financial cost for traversing each of the travel sections.

48. The system as claimed in claim 35 wherein:
the calculator pre-computation submodule is for calculating an estimated sectional financial cost for traversing one or more of the travel sections; and
further comprising:
a cost pre-computation submodule, coupled to the predetermined level module, for comparing the estimated sectional financial cost for traversing each of the travel sections; and
an aggregator pre-computation submodule, coupled to the predetermined level module, for selecting an intermediate stop with the lowest of the estimated sectional financial cost for traversing each of the travel sections.

* * * * *